US012561120B1

(12) United States Patent
Zheng et al.

(10) Patent No.: US 12,561,120 B1
(45) Date of Patent: Feb. 24, 2026

(54) COLLECTIVE OPERATION AND COMPUTE OPERATION PIPELINING

(71) Applicant: Amazon Technologies, Inc., Seattle, WA (US)

(72) Inventors: Hongbin Zheng, San Jose, CA (US); Qingrui Liu, San Jose, CA (US); Shruthi Hebbur Prasanna Kumar, Fremont, CA (US); Donald John Kretsch, Cupertino, CA (US); Yuwen Jia, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 18/540,592

(22) Filed: Dec. 14, 2023

(51) Int. Cl.
*G06F 9/44* (2018.01)
*G06F 8/41* (2018.01)

(52) U.S. Cl.
CPC ............ *G06F 8/4452* (2013.01); *G06F 8/443* (2013.01)

(58) Field of Classification Search
CPC ............................... G06F 8/4452; G06F 8/443
See application file for complete search history.

(56) References Cited

U.S. PATENT DOCUMENTS

| | | | | |
|---|---|---|---|---|
| 10,860,766 | B1 * | 12/2020 | Sivaraman | G06F 8/443 |
| 11,782,706 | B1 * | 10/2023 | Diamant | G06F 8/443 |
| | | | | 712/221 |
| 12,174,727 | B1 * | 12/2024 | Hanebutte | G06F 8/443 |
| 2022/0382548 | A1 * | 12/2022 | Mukai | G06F 8/443 |
| 2023/0015688 | A1 * | 1/2023 | Durakovic | G06F 8/443 |
| 2025/0045029 | A1 * | 2/2025 | Weber | G06F 8/443 |

* cited by examiner

*Primary Examiner* — Qamrun Nahar
(74) *Attorney, Agent, or Firm* — Kilpatrick Townsend & Stockton LLP

(57) ABSTRACT

Techniques for collective operation and compute operation pipelining on integrated circuit devices configured to perform operations associated with machine learning models are described herein. A first node or integrated circuit device can generate a first input subtensor and a second input subtensor based on the first input tensor. Several collective operations and compute operations can be performed on the first input subtensor and second input subtensor in combination with input subtensors from other integrated circuit devices to generate output subtensors. The first node can generate an output tensor based on the output subtensors.

20 Claims, 15 Drawing Sheets

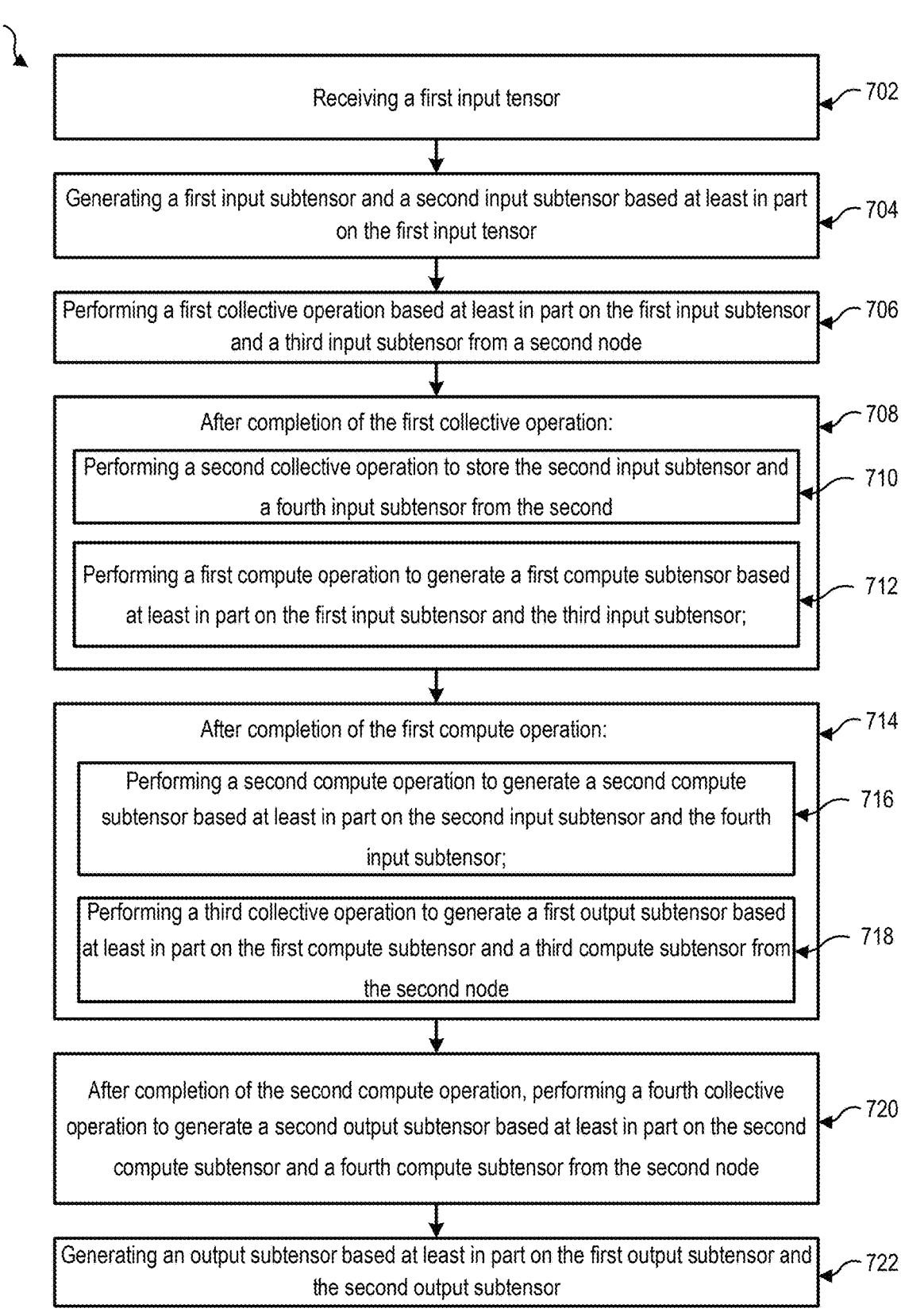

700

702 — Receiving a first input tensor

704 — Generating a first input subtensor and a second input subtensor based at least in part on the first input tensor 706 — Performing a first collective operation based at least in part on the first input subtensor and a third input subtensor from a second node 708 — After completion of the first collective operation:

710 — Performing a second collective operation to store the second input subtensor and a fourth input subtensor from the second 712 — Performing a first compute operation to generate a first compute subtensor based at least in part on the first input subtensor and the third input subtensor;

714 — After completion of the first compute operation:

716 — Performing a second compute operation to generate a second compute subtensor based at least in part on the second input subtensor and the fourth input subtensor;

718 — Performing a third collective operation to generate a first output subtensor based at least in part on the first compute subtensor and a third compute subtensor from the second node 720 — After completion of the second compute operation, performing a fourth collective operation to generate a second output subtensor based at least in part on the second compute subtensor and a fourth compute subtensor from the second node 722 — Generating an output subtensor based at least in part on the first output subtensor and the second output subtensor

```
for j0 in 0..2
    B[j0, 32, 4, 128] = AllGather(A[j0, 4, 128]) rank 32 for i in 0..32
    for j0 in 0..2
        for j1 in 0..4
            for k in 0..128
                C[j0, i, j1, k] = multiply(B[j0, i, j1, k], x)

for i in 0..32
    for j0 in 0..2
        for j1 in 0..4
            for k in 0..128
                D[j0, i, j1, k] = relu(C[j0, i, j1, k])

for j0 in 0..2
    E[j0, 4, 128] = ReduceScatter(D[j0, 32, 4, 128]) rank 32
```

800 ⟶

```
B[32, 8, 128] = AllGather(A[8, 128]) rank 32 for i in 0..32
    for j in 0..8
        for k in 0..128
            C[32, 8, 128] = func(B[i, j, k])

D[8, 128] = ReduceScatter(C[32, 8, 128]) rank 32
```

FIG. 8A

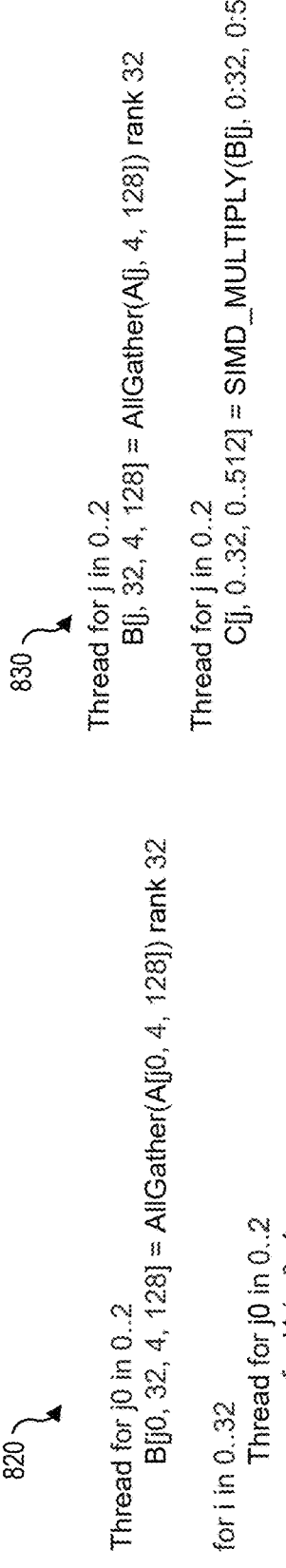

820

```
Thread for j0 in 0..2
    B[j0, 32, 4, 128] = AllGather(A[j0, 4, 128]) rank 32 for i in 0..32
    Thread for j0 in 0..2
        for j1 in 0..4
            for k in 0..128
                C[j0, i, j1, k] = multiply(B[j0, i, j1, k], x)

for i in 0..32
    Thread for j0 in 0..2
        for j1 in 0..4
            for k in 0..128
                D[j0, i, j1, k] = relu(C[j0, i, j1, k])

Thread for j0 in 0..2
    E[j0, 4, 128] = ReduceScatter(D[j0, 32, 4, 128]) rank 32
```

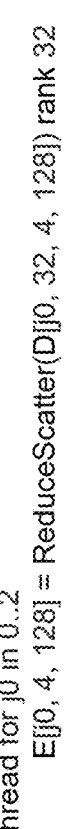

830

```
Thread for j in 0..2
    B[j, 32, 4, 128] = AllGather(A[j, 4, 128]) rank 32

Thread for j in 0..2
    C[j, 0..32, 0..512] = SIMD_MULTIPLY(B[j, 0:32, 0:512], x)

Thread for j in 0..2
    D[j, 0..32, 0..512] = SIMD_RELU(C[j, 0:32, 0:512])

Thread for j in 0..2
    E[j, 4, 128] = ReduceScatter(D[j, 32, 4, 128]) rank 32
```

840

```
Thread for i in 0..2
    B[i, 32, 128] = AllGather(A[i, 128]) rank 32
    C[i, 0..32, 0..128] = SIMD_MULTIPLY(B[i, 0:32, 0:128], x)
    D[i, 0..32, 0..128] = SIMD_RELU(C[i, 0:32, 0:128])
    E[i, 128] = ReduceScatter(D[i, 32, 128]) rank 32
```

COLLECTIVE OPERATION AND COMPUTE OPERATION PIPELINING

BACKGROUND

The operations of an integrated circuit device, such as a processor, can be directed by machine-level instructions. These instructions can be generated by a software program referred to as a compiler, which transforms programs written in a human-readable programming language into a machine language that can be understood by the integrated circuit device. The output of the compiler can be referred to as program code, object code, program instructions, or machine instructions, among other examples.

Compilers may utilize various phases that work together in coordination to perform the compilation. Some of these phases may relate to optimizations that aim to minimize the computer program's execution time, power consumption, and memory usage when the instructions are executed on the integrated circuit device. For example, the compiler may include a phase referred to as an instruction scheduler, which attempts to rewrite the code to improve instruction-level parallelism. The instruction scheduler may decompose instructions into multiple stages to improve the pipelining of the instructions.

BRIEF DESCRIPTION OF THE DRAWINGS

Various embodiments in accordance with the present disclosure will be described with reference to the drawings, in which:

FIG. 7 illustrates an example computer-implemented method for describing the techniques herein;

FIGS. 8A and 8B illustrate example pseudo-code for describing the techniques herein;

DETAILED DESCRIPTION

Figure 1:
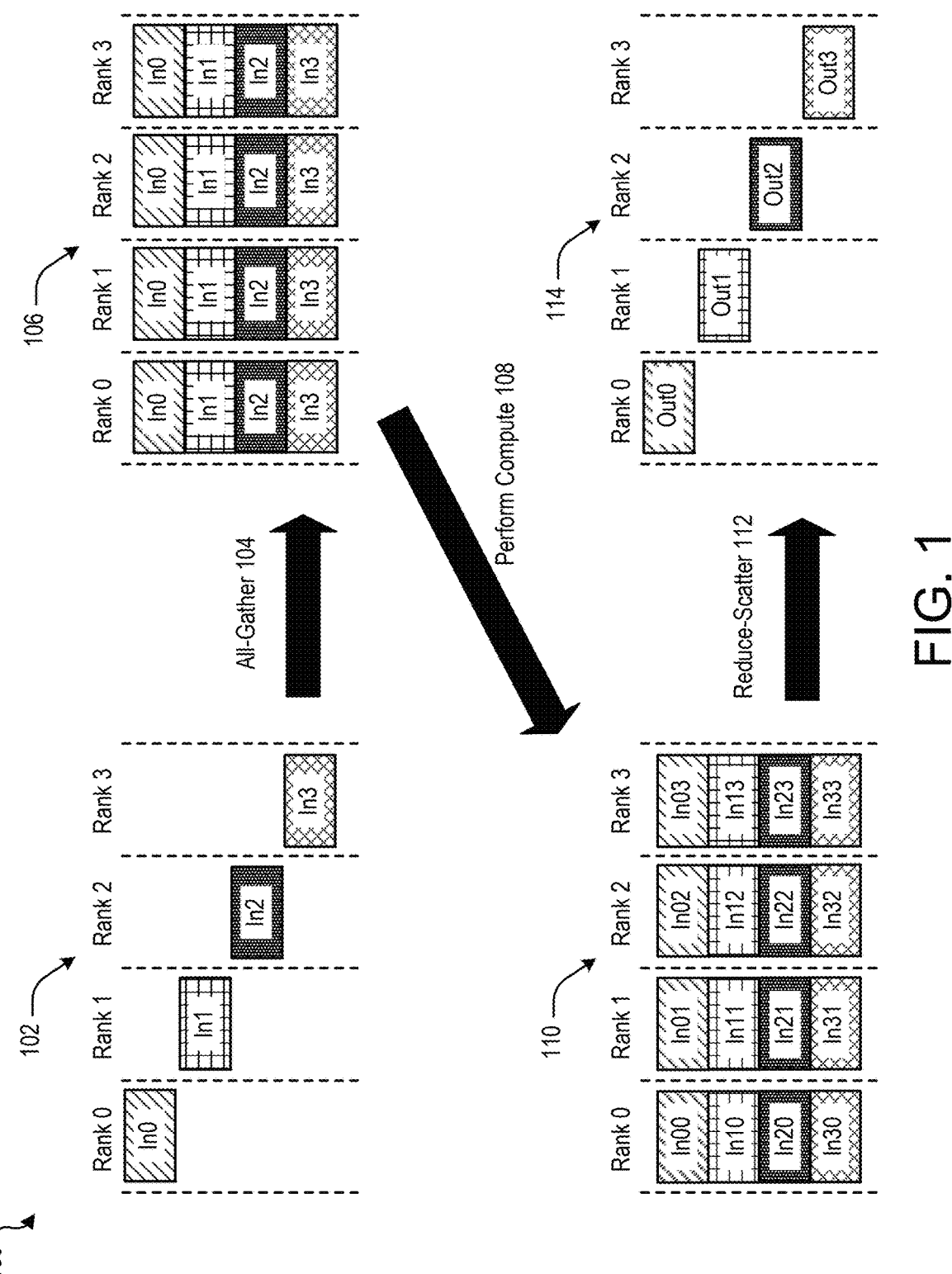
FIG. 1 illustrates an example diagram for describing the techniques herein.

Some optimizations performed by a compiler may be dependent on the specific architecture of the integrated circuit device that is to execute the compiler-generated instructions. These optimizations are generally performed after the hardware-independent optimizations have been performed, and receive as input an intermediate representation of the source code outputted by the hardware-independent optimizations. In various examples, the hardware-specific optimizations may take into consideration the number of registers on the integrated circuit device, the instruction set architecture (ISA) of the integrated circuit device, the supported data types, the cache size, the memory transfer rates, the number of arithmetic logic units (ALUs) or floating-point units (FPUs) on the integrated circuit device, among other possibilities.

In some cases, the integrated circuit device can include multiple execution engines. For example, the integrated circuit device can include parallel execution engines that are capable of performing large, multi-stage computations, such as convolutions. As another example, the integrated circuit device can include execution engines for more specific operations, such as accumulating values or performing floating point math. The data on which the execution engines operate can be retrieved from a memory of the integrated circuit device. Results produced by the execution engines can further be written to the memory.

In some examples, integrated circuit devices having multiple execution engines can be used to execute operations of an artificial neural network. Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, includes multiple layers of processing nodes. Each processing node (which can be referred to as a node) in a layer can perform computations on input data generated by processing nodes in a preceding layer to generate output data. For example, a processing node may perform a set of arithmetic operations, such as multiplications and additions to generate an intermediate output, or perform post-processing operations on the intermediate output to generate a final output. An artificial neural network may include thousands or more of processing nodes and millions or more of parameters.

When the integrated circuit device includes multiple execution engines, in various examples, the compiler can produce sets of instructions for each execution engine. The instructions for an execution engine can includes steps such as reading data from memory of the device, performing a computation on the data, and writing a result of the computation back to the memory of the device. In some examples, the execution engines can asynchronously and independently execute respective sets of instructions so that the execution engines can operate in parallel.

In some examples, multiple integrated circuit devices can be used in conjunction to execute operations of the artificial neural network because the artificial neural network is too large for a single integrated circuit device. Each integrated circuit device of the multiple integrated circuit devices executing the operations of a single artificial neural network can be referred to as a worker. Similarly, workers can be referred to as nodes or worker nodes. In some examples, the execution engines of a worker may perform a sequence of a first collective operation (which can be referred to as a "CC Op") followed by one or more compute operations followed by a second collective operation. Collective operations can be used to move data between the workers executing operations of a single artificial neural network. The data that is moved during a collective operation can be training data, weights of the artificial neural network, or other data of the artificial neural network. Example collective operations can include the all-gather operation and the reduce-scatter operation. In some examples, there can be data dependency between the successive operations in the sequence of the first collective operation, the one or more compute operations, and the second collective operation such that each operation can require the prior operation to be completed before beginning. For example, the one or more compute operations can be data dependent on the first collective operation such that the first collective operation must finish before the one or more compute operations can be performed.

However, collective operations and compute operations use different resources of the worker. For example, collective operations can primarily use direct memory access (which can be referred to as "DMA") resources of a worker. On the other hand, compute operations can primarily use processor engine resources of a worker. Because collective operations and compute operations use different resources, collective operations and compute operations can be pipelined. However, the data dependency between the successive collective operations and compute operations can require the techniques described herein to achieve pipelining of the collective operations and compute operations on a worker.

The techniques described herein can be particularly useful for artificial neural networks that are large and use model parallelism across multiple workers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example dataflow graph 100 depicting a sequence of collective operations and compute operations for multiple workers of an artificial neural network. The dataflow graph 100 can be used to illustrate at least some aspects of the data dependency of the sequence of collective and compute operations. In this example, the artificial neural network includes four workers. The beginning of the sequence can be seen at 102. The four workers can also be referred to by a rank number. For example, a first worker can be rank 0, a second worker can be rank 1, a third worker can be rank 2, and a fourth worker can be rank 3. Each worker has input data. For example, rank 0 has input data In0, rank 1 has input data In1, rank 2 has input data In2, and rank 3 has input data In3. Input data can be organized in a variety of ways. For example, input data can be organized as tensors such that the input data can be referred to as input tensors. In other examples, input data can be organized in vectors, arrays, scalars, and the like.

The dataflow graph 100 illustrates an all-gather operation 104 that transforms the input data on the workers as seen at 102 to the data on the workers as seen at 106. In the all-gather operation 104, the input data of all the workers is distributed to all the workers such that each worker has In0, In1, In2, and In3 as illustrated at 106.

After completion of the all-gather operation 104 such that all workers have all input data as illustrated at 106, the workers can perform one or more compute operations 108 on the input data. Compute operations can include one or more types of arithmetic and other operations. In some examples, compute operations can use values such as weights when performing the compute operations. Weights may be different between the workers such that the outputs of the compute operations may be different between workers.

The one or more compute operations 108 can generate compute data from the input data. The compute data can be tensors, vectors, arrays, scalars, and the like. In some examples, the compute data can be referred to as compute output data. In some examples, the compute data can be referred to as compute tensors. An example illustration of compute data can be seen at 110. In this example, rank 0 performs one or more compute operations on input data In0, In1, In2, and In3 to generate compute data In00, In10, In20, and In30. In the illustration, the second number of the compute data reference is associated with the rank number. It can be seen at 110 that the compute data can be different for each worker. For example, the compute data for the worker at rank 0 can include compute data In00, In10, In20, and In30 while the compute data for the worker at rank 1 can include compute data In01, In11, In21, and In31.

After completion of the one or more compute operations 108 such that the workers have their respective compute data, a reduce-scatter operation 112 can be performed. The reduce-scatter operation 112 can transform the compute data as seen at 110 into the output data as seen at 114. Output data can be tensors, vectors, arrays, scalars, and the like. A reduce-scatter operation 112 can be used to combine associated data across the workers and then disperse the data across the workers. For example, Out0 as seen at 114 can be generated from In00 of rank 0, In01 of rank 1, In02 of rank 2, and In03 of rank 3 as seen at 110. In some examples, Out0 as seen at 114 can be the tensor sum In00 of rank 0, In01 of rank 1, In02 of rank 2, and In03 of rank 3. In this example, In00 of rank 0, In01 of rank 1, In02 of rank 2, and In03 of rank 3 are partial sums that need to be added together. More generally, In00 of rank 0, In01 of rank 1, In02 of rank 2, and In03 of rank 3 are partial computations that need to be combined through a reduce-scatter operation to generate Out0. In some examples, Out0 as seen at 114 can be generated using a different operation or combination of In00 of rank 0, In01 of rank 1, In02 of rank 2, and In03 of rank 3. Similarly, Out1 as seen at 114 can be generated from In10 of rank 0, In11 of rank 1, In12 of rank 2, and In13 of rank 3 as seen at 110.

The dataflow graph 100 depicts an all-gather operation 104 and a reduce-scatter operation 112. However, the techniques described herein can be used in relation to any sequence of a first collective operation (for example, an all-gather or reduce-scatter operation) followed by one or more compute operations followed by a second collective operation. For example, the techniques described herein can apply if the first collective operation (in place of the all-gather operation 104) is a reduce-scatter operation and the second collective operation (in place of the reduce-scatter operation 112). Likewise, the first collective operation and/or the second operation can be another type of collective operation other than the all-gather operation 104 and/or the reduce-scatter operation 112.

Figure 2:
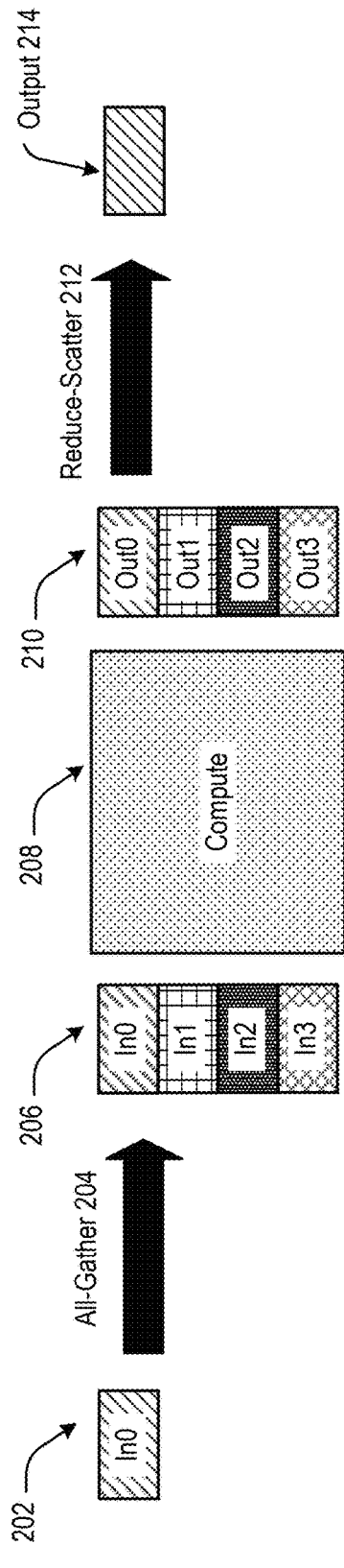
FIG. 2 illustrates an example diagram for describing the techniques herein.

FIG. 2 illustrates an example dataflow graph 200 depicting a sequence of collective operations and compute operations for a single worker of the artificial neural network. For example, the single worker could be the rank 0 worker of FIG. 1. Similar to FIG. 1, the artificial neural network associated with FIG. 2 includes four workers. The single worker can have an input In0 at 202 (for example, the input In0 as seen at 102 of FIG. 1). An all-gather operation 204 can be performed such that the single worker receives corresponding input data from the other workers. After the all-gather operation 204 is performed by the single worker, the single worker can have input data In0, In1, In2, and In3 as seen at 206 (for example, the input data In0, In1, In2, and In3 as seen at 106 of FIG. 1). The single worker can perform one or more compute operations at 208. The outputs of the compute operation can be seen at 210 and include Out0, Out1, Out2, and Out3 (for example, the compute data In00, In10, In20, and In30 as seen at 110 of FIG. 1). The outputs of the compute operation can be referred to as compute data or compute tensors. A reduce-scatter operation 212 can be performed such that the single worker receives corresponding data to Out0 (for example, the compute data In01, In02, and In03 as seen at 110 of FIG. 1) from the other workers of the artificial neural network. The single worker can combine the compute data from the other workers to generate an output 214. The output 214 can also be referred to as a reduce output.

Figure 3:
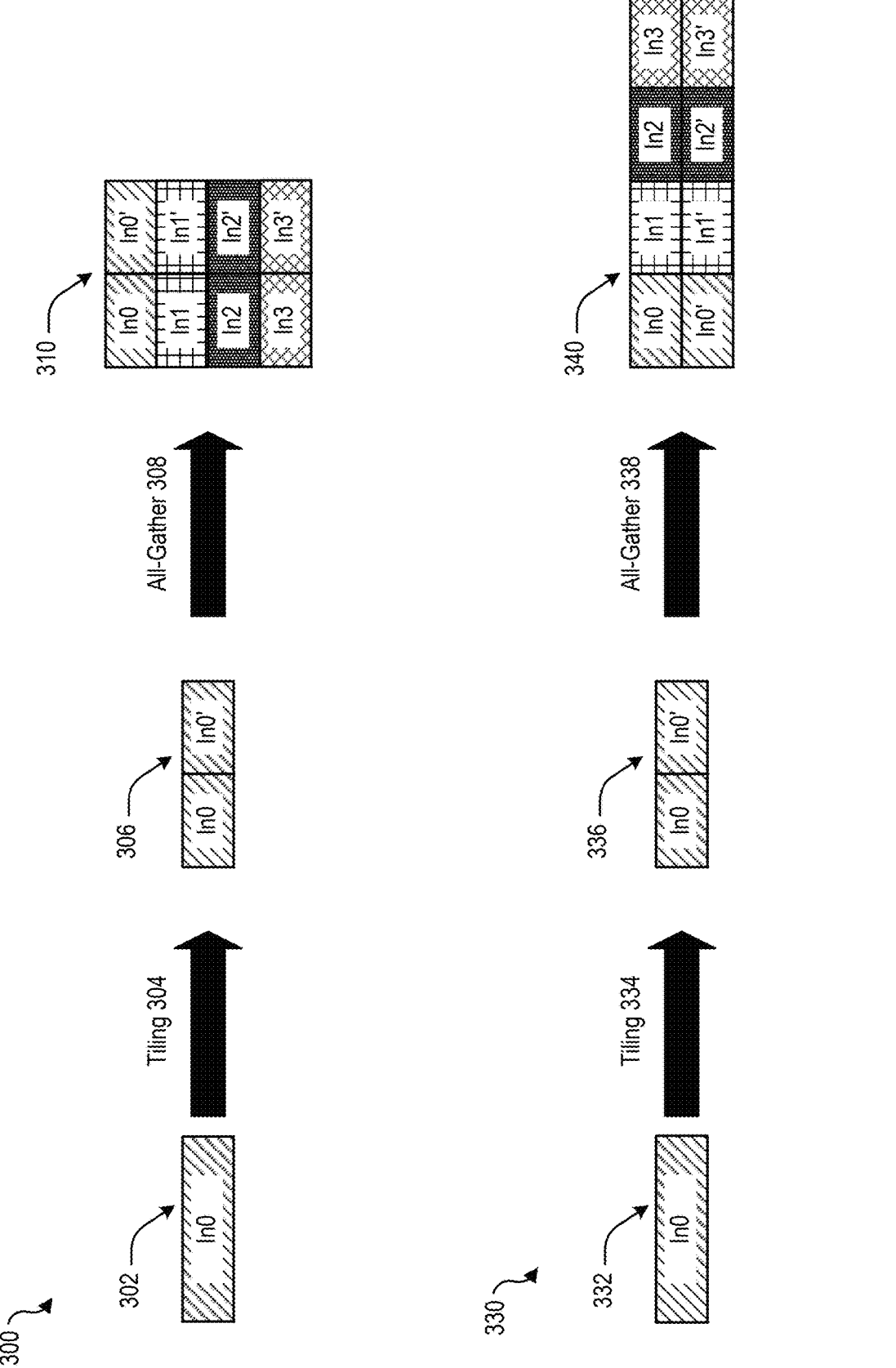
FIG. 3 illustrates example diagrams for describing the techniques herein.

FIG. 3 illustrates techniques for preparing to pipeline a sequence of collective and compute operations as described herein. Diagram 300 includes a first sequence for an all-gather operation (for example, the all-gather operation 104 of FIG. 1) or any other first collective operation in a sequence of collective and compute operations. The diagram 300 can be from the perspective of a first worker. The first worker has a first input In0 (for example, the In0 at 202 of FIG. 2) at 302. The first worker can perform tiling 304 on In0. Tiling 304 refers to segmenting a piece of data into x portions where x is the tiling factor. A tiling factor can be two, three, four, five, ten, twenty, one hundred, or any other whole number. In the example where In0 is a tensor, tiling 304 can segment In0 at 302 into two subtensors In0 and In0' at 306. In some examples, In0 at 306 represents the first half of the columns of In0 at 302 and In0' refers to the second half of the columns of In0 at 302. The other workers of the artificial neural network can also perform the same tiling on their respective inputs. Then when the first worker (and other workers) perform the all-gather operation 308, the all-gather operation 308 can be performed worker by worker such that the input data at the first worker (and other workers) is received left-to-right and top-to-bottom at 310. An all-gather operation 308 performed in this way can be referred to as a worker-first all-gather operation or an all-gather operation in worker-first order. For example, the sequence of the all-gather operation 308 can be In0 and In0' of the first worker, In1 and In1' of a second worker, In2 and In2' of a third worker, and In3 and In3' of a fourth worker. As such, the memory will also follow the same layout for the all-gather operation 308 with the order of In0, In0', In1, In1', In2, In2', In3, In3'.

Diagram 330 includes a second sequence for an all-gather operation (for example, the all-gather operation 104 of FIG. 1) or any other first collective operation in a sequence of collective and compute operations. The diagram 330 can be from the perspective of a first worker. The first worker has a first input In0 (for example, the In0 at 202 of FIG. 2) at 332. The first worker can perform tiling 334 on In0. In the example where In0 is a tensor, tiling 334 can segment In0 at 332 into two subtensors In0 and In0' at 336. In some examples, In0 at 336 represents the first half of the columns of In0 at 332 and In0' refers to the second half of the columns of In0 at 332. The other workers of the artificial neural network can also perform the same tiling on their respective inputs. Then when the first worker (and other workers) perform the all-gather operation 338, the all-gather operation 338 can be performed on the first segment of each worker (for example, In0 at 336 and an equivalent In1 at a second worker) followed by the second segment of each worker (for example, In0' at 336 and an equivalent In1' at the second worker) such that the input data at the first worker (and other workers) is received left-to-right and top-tobottom at 340. An all-gather operation 338 performed in this way can be referred to as a segment-first all-gather operation or an all-gather operation in segment-first order. For example, the sequence of the all-gather operation 308 can be In0 of the first worker, In1 of a second worker, In2 of a third worker, In3 of a fourth worker, In0' of the first worker, In1' of the second worker, In2' of the third worker, and In3' of the fourth worker. As such, the memory will also follow the same layout for the all-gather operation 338 with the order of In0, In1, In2, In3, In0', In1', In2', In3'. When the all-gather 338 is performed in segment-first order, the first worker is able to begin compute operations on In0, In1, In2, and In3 at 340 as soon as In3 is fully received while the worker continues to perform the all-gather 338 on In0', In1', In2', and In3'. This allows for pipelining of the sequence of collective and compute operations.

The techniques described herein can be applied to any collective operation. For example, tiling inputs at a worker node can be done in preparation for any collective operation.

Figure 4:
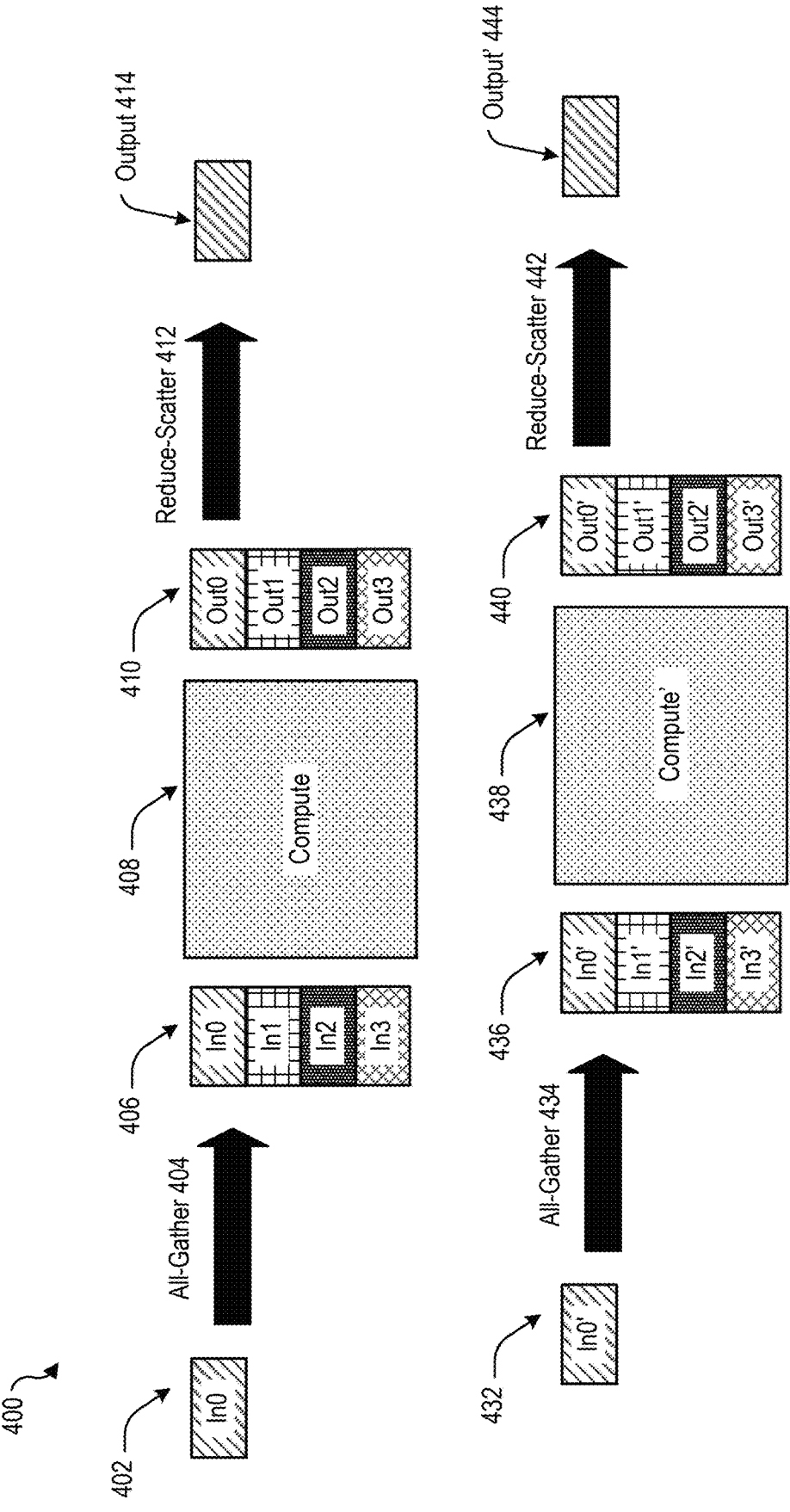
FIG. 4 illustrates an example diagram for describing the techniques herein.

FIG. 4 illustrates an example dataflow graph 400 depicting a sequence of collective operations and compute operations for a single worker of the artificial neural network. For example, the single worker could be the rank 0 worker of FIG. 1. Similar to FIG. 1, the artificial neural network associated with FIG. 4 includes four workers. The single worker can have an input In0 (for example, the input In0 as seen at 102 of FIG. 1). As described in relation to FIG. 3, the input In0 can be tiled into a first segment In0 at 402 and a second segment In0' at 432 (for example, the In0 and In0' as seen at 336 of FIG. 3).

As described in relation to sequence 330 of FIG. 3, an all-gather operation on the single worker can be performed in a segment-first order. An all-gather operation performed in a segment-first order can be abstracted into a first all-gather operation 404 and a second all-gather operation 434. For example, the first all-gather operation 404 can relate to the first segments of the inputs at the workers (for example, In0, In1, In2, and In3). For example, the second all-gather operation 444 can relate to the second segments of the inputs at the workers (for example, In0', In1', In2', and In3').

Once the first all-gather operation 404 is completed, a first compute operation 408 on the inputs In0, In1, In2, and In3 at 406 can be performed. The first compute operation 408 can be performed once the first all-gather operation 404 is completed due to the data dependency of the first compute operation 408 on the first all-gather operation 404 (or any other first collective operation). Similarly, once the first all-gather operation 404 is completed, the second all-gather operation 434 can be performed. The second all-gather operation 434 can be performed once the first all-gather operation 404 is completed due to the worker resources for collective operations (for example, the direct memory access resources) being devoted to the first all-gather operation 404 until the first all-gather operation 404 is completed. The outputs Out0, Out1, Out2, and Out3 at 410 are the outputs of the first compute operation 408 on the inputs In0, In1, In2, and In3 at 406. In this way, Out0, Out1, Out2, and Out3 at 410 can be referred to as being generated by the first worker after performing the first compute operation 406 on the inputs In0, In1, In2, and In3 at 406. In this example, Out0 corresponds to In0, Out1 corresponds to In1, Out2 corresponds to In2, and Out3 corresponds to In3. For example, Out0 is the output of the compute operation on In0. As described herein, these outputs can also be referred to as compute information or compute data.

Once the second all-gather operation 434 is completed and the first compute operation 408 is completed, a second compute operation 438 (also referred to as compute ') on the inputs In0', In1', In2', and In3' at 436 can be performed. The second compute operation 438 can be performed once the second all-gather operation 434 is completed and the first compute operation 408 is completed due to 1) the data dependency of the second compute operation 438 on the second all-gather operation 434 and 2) due to the worker resources for compute operations (for example, processor utilization) being devoted to the first compute operation 408 until the first compute operation 408 is completed. The outputs Out0', Out1', Out2', and Out3' at 440 are the outputs of the second compute operation 438 on the inputs In0', In1', In2', and In3' at 436. In this way, Out0', Out1', Out2', and Out3' at 440 can be referred to as being generated by the first worker after performing the second compute operation 436 on the inputs In0', In1', In2', and In3' at 436. In this example, Out0' corresponds to In0', Out1' corresponds to In1', Out2' corresponds to In2', and Out3' corresponds to In3'. For example, Out0' is the output of the compute operation on In0'.

Similarly, once the second all-gather operation 434 is completed and the first compute operation 408 is completed, a first reduce-scatter operation 412 on the outputs Out0, Out1, Out2, and Out3 at 410 can be performed. The first reduce-scatter operation 412 can be performed once the second all-gather operation 434 is completed and the first compute operation 408 is completed due to 1) the data dependency of the first reduce-scatter operation 412 on the first compute operation 408 and 2) due to the worker resources for collective operations (for example, the direct memory access resources) being devoted to the second all-gather operation 434 until the second all-gather operation 434 is completed. The first reduce-scatter operation 412 combines the outputs of all workers and scatters portions to each worker. The first reduce-scatter operation 412 is described further in relation to FIGS. 5A-5B. The first worker can have an output 414 after the first reduce-scatter operation 412 is performed.

Once the second compute operation 438 is completed and the first reduce-scatter operation 412 is completed, a second reduce-scatter operation 442 on the outputs Out0', Out1', Out2', and Out3' at 440 can be performed. The second reduce-scatter operation 442 can be performed once the second compute operation 438 is completed and the first reduce-scatter operation 412 is completed due to 1) the data dependency of the second reduce-scatter operation 442 on the second compute operation 438 and 2) due to the worker resources for collective operations (for example, the direct memory access resources) being devoted to the first reduce-scatter operation 412 until the first reduce-scatter operation 412 is completed. The second reduce-scatter operation 442 combines the outputs of all workers and scatters portions to each worker. The second reduce-scatter operation 442 is described further in relation to FIG. 5. The first worker can have an output' 444 after the second reduce-scatter operation 442 is performed.

Figure 5A:
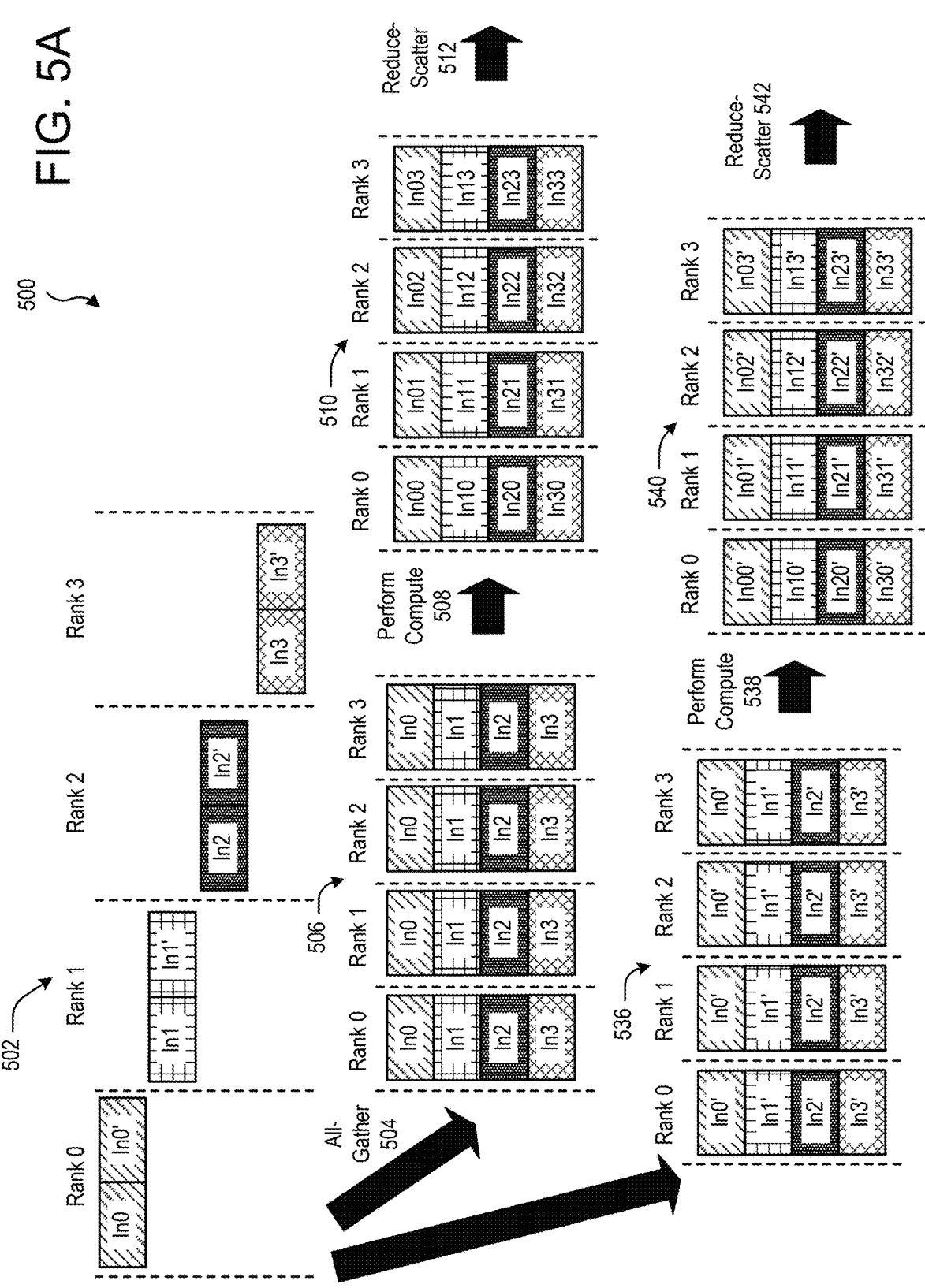
FIGS. 5A and 5B illustrate an example diagram for describing the techniques herein.
Figure 5B:
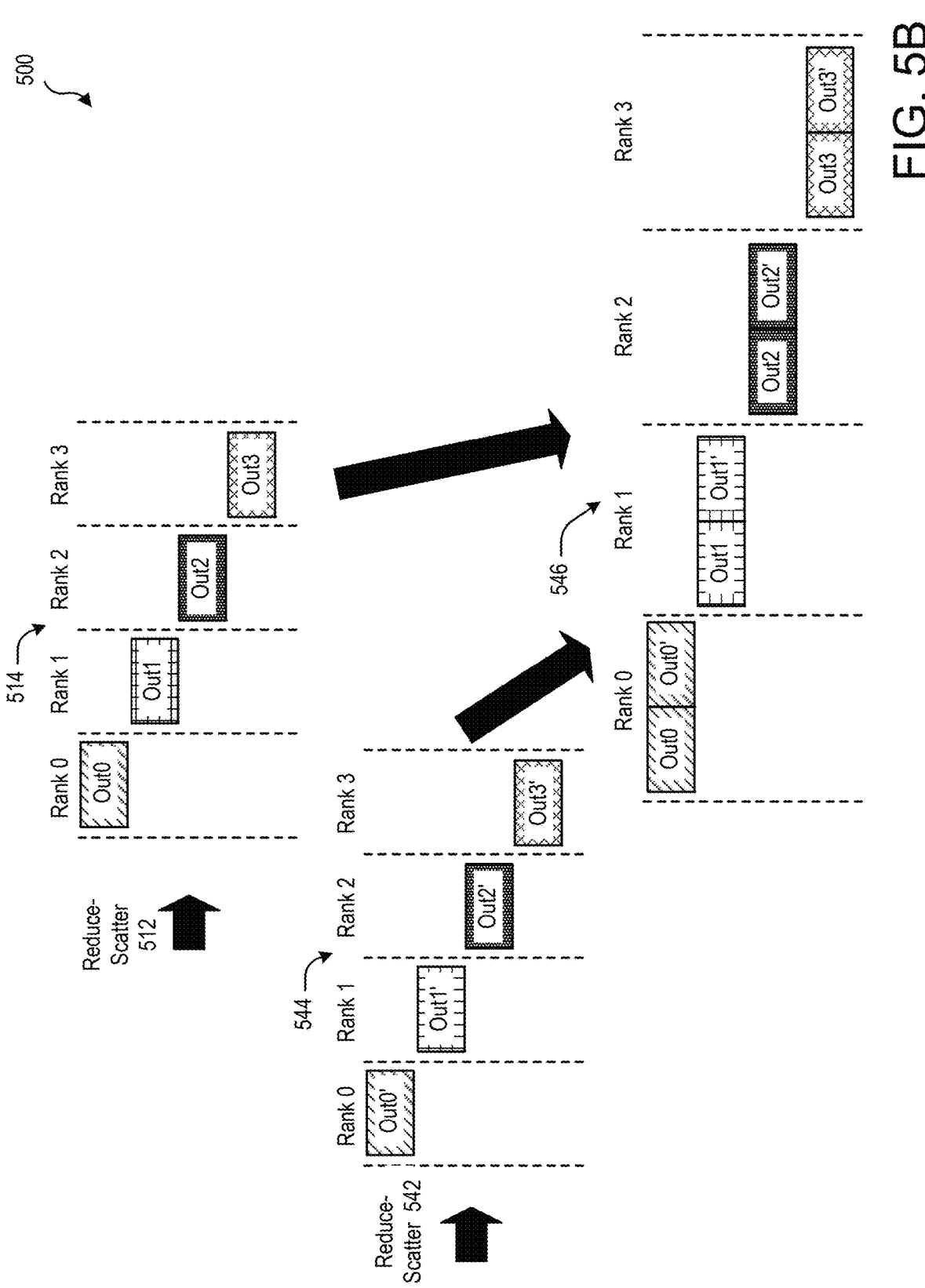

FIGS. 5A-5B illustrate an example dataflow graph 500 depicting a sequence of collective operations and compute operations for multiple workers of an artificial neural network in relation to the sequences 400 and 430 of FIG. 4. In this example, the artificial neural network includes four workers. The four workers can also be referred to by a rank number. For example, a first worker can be rank 0, a second worker can be rank 1, a third worker can be rank 2, and a fourth worker can be rank 3. Each worker has input data. For example, rank 0 has input data In0, rank 1 has input data In1, rank 2 has input data In2, and rank 3 has input data In3. The beginning of the sequence can be seen at 502 where the inputs of each worker can be tiled. For example, the input In0 at rank 0 can be tiled into In0 and In0'. Input data can be organized in a variety of ways. For example, input data can be organized as tensors such that the input data can be referred to as input tensors. In other examples, input data can be organized in vectors, arrays, scalars, and the like.

Once the input data for each worker is tiled, each worker can perform an all-gather operation in segment-first order. An all-gather operation performed in a segment-first order can be abstracted into a first all-gather operation 504 and a second all-gather operation 534. For example, the first all-gather operation 504 can relate to the first segments of the inputs at the workers (for example, In0, In1, In2, and In3 at 502). For example, the second all-gather operation 544 can relate to the second segments of the inputs at the workers (for example, In0', In1', In2', and In3' at 502). The all-gather operation can begin with a first all-gather operation 504 (for example, the first all-gather operation 404 of FIG. 4). The first all-gather operation 504 can gather all of the first segments of the inputs at the workers at each of the workers such that each worker has all of the first segments of the inputs stored in memory. For example, each worker at rank 0, rank 1, rank 2, and rank 3 all each have the first segments In0, In1, In2, and In3 at 506 in that memory order.

Once the first all-gather operation 504 is completed, the workers can perform a first compute operation 508 (for example, the first compute operation 408 of FIG. 4) on the inputs In0, In1, In2, and In3 that each worker has as shown at 506. The first compute operation 508 at each worker can be performed once the first all-gather operation 504 is completed due to the data dependency of the first compute operation 508 on the first all-gather operation 504 (or any other first collective operation). An example illustration of compute data can be seen at 510. In this example, rank 0 performs one or more compute operations on input data In0, In1, In2, and In3 to generate compute data In00, In10, In20, and In30, respectively. Similarly, rank 1 performs one or more compute operations on input data In0, In1, In2, and In3 to generate compute data In01, In11, In21, and In31. It can be seen at 510 that the compute data can be different for each worker. The compute data can also be referred to as compute outputs.

Similarly, once the first all-gather operation 504 is completed, the workers can perform a second all-gather operation 534 (for example, the second all-gather operation 434 of FIG. 4). The second all-gather operation 534 can be performed once the first all-gather operation 504 is completed due to the worker resources collective operations (for example, the direct memory access resources) of each worker being devoted to the second all-gather operation 534 until the second all-gather operation 534 is completed. The second all-gather operation 534 can gather all of the second segments of the inputs at the workers at each of the workers such that each worker has all of the second segments of the inputs. For example, each worker at rank 0, rank 1, rank 2, and rank 3 all each have the second segments In0', In1', In2', and In3' at 536 in that memory order.

Once the second all-gather operation 534 is completed and the first compute operation 508 is completed, a second compute operation 538 (for example, the second compute operation 438 of FIG. 4) on the inputs In0', In1', In2', and In3' that each worker has as shown at 536. The second compute operation 538 can be performed the second all-gather operation 534 is completed and the first compute operation 508 is completed due to 1) the data dependency of the second compute operation 538 on the second all-gather operation 534 and 2) due to the worker resources for compute operations (for example, processor utilization) being devoted to the first compute operation 508 until the first compute operation 508 is completed. An example illustration of compute data can be seen at 540. In this example, rank 0 performs one or more compute operations on input data In0', In1', In2', and In3' to generate compute data In00', In10', In20', and In30', respectively. Similarly, rank 1 performs one or more compute operations on input data In0', In1', In2', and In3' to generate compute data In01', In11', In21', and In31'. It can be seen at 540 that the compute data can be different for each worker.

Similarly, once the second all-gather operation 534 is completed and the first compute operation 508 is completed, a first reduce-scatter operation 512 on the first compute data (for example, In00, In01, In02, In03, In10, In11, In12, In13) can be performed. The first reduce-scatter operation 512 can be performed once the second all-gather operation 534 is completed and the first compute operation 508 is completed due to 1) the data dependency of the first reduce-scatter operation 512 on the first compute operation 508 and 2) due to the worker resources for collective operations (for example, the direct memory access resources) being devoted to the second all-gather operation 534 until the second all-gather operation 534 is completed. The first reduce-scatter operation 512 combines the outputs of all workers and scatters portions to each worker. For example, the first reduce-scatter operation 512 can generate Out0 based at least in part on In00, In01, In02, and In03. Of note, the Out0 is generated based on data from each of the ranks 0, 1, 2, and 3. In some examples, Out0 as seen at 514 can be the tensor sum In00 of rank 0, In01 of rank 1, In02 of rank 2, and In03 of rank 3. In this example, In00 of rank 0, In01 of rank 1, In02 of rank 2, and In03 of rank 3 are partial sums that need to be added together. More generally, In00 of rank 0, In01 of rank 1, In02 of rank 2, and In03 of rank 3 are partial computations that need to be combined through the first reduce-scatter operation 514 to generate Out0. Similarly, the first reduce-scatter operation 512 can generate Out1 based at least in part on In10, In11, In12, and In13.

Once the second compute operation 538 is completed and the first reduce-scatter operation 512 is completed, a second reduce-scatter operation 542 on the second compute data (for example, In00', In01', In02', In03', In10', In11', In12', In13') can be performed. The second reduce-scatter operation 542 can be performed once the second compute operation 538 is completed and the first reduce-scatter operation 512 is completed due to 1) the data dependency of the second reduce-scatter operation 542 on the second compute operation 538 and 2) due to the worker resources for collective operations (for example, the direct memory access resources) being devoted to the first reduce-scatter operation 512 until the first reduce-scatter operation 512 is completed. The second reduce-scatter operation 542 combines the outputs of all workers and scatters portions to each worker. The second reduce-scatter operation 542 combines the outputs of all workers and scatters portions to each worker. For example, the second reduce-scatter operation 542 can generate Out0' based at least in part on In00', In01', In02', and In03'. Of note, the Out0' is generated based on data from each of the ranks 0, 1, 2, and 3. In some examples, Out0' is the tensor sum of In00', In01', In02', and In03'. In some examples, Out0' as seen at 544 can be the tensor sum In00'; of rank 0, In01' of rank 1, In02' of rank 2, and In03' of rank 3. In this example, In00' of rank 0, In01' of rank 1, In02' of rank 2, and In03' of rank 3 are partial sums that need to be added together. More generally, In00' of rank 0, In01' of rank 1, In02' of rank 2, and In03' of rank 3 are partial computations that need to be combined through the second reduce-scatter operation 544 to generate Out0'. Similarly, the second reduce-scatter operation 542 can generate Out1' based at least in part on In10', In11', In12', and In13'.

Once the first reduce-scatter operation 512 and the second reduce-scatter operation 542 have been performed, the outputs at each worker can be combined. For example, the worker at rank 0 has both Out0 and Out0'. The worker at rank 0 can concatenate the Out0 and Out0' in a way equivalent to the tiling done prior to the all-gather operations.

Figure 6:
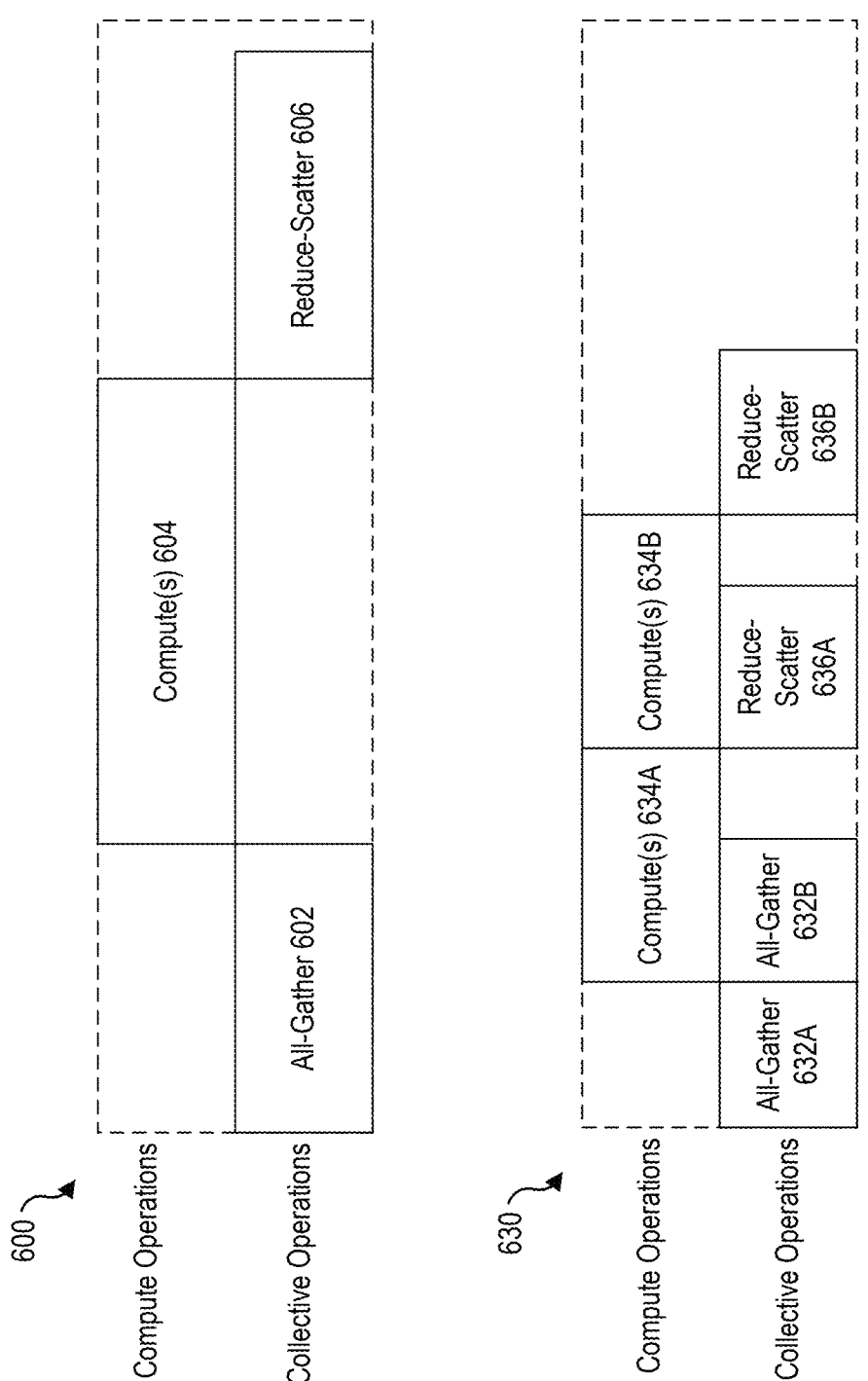
FIG. 6 illustrates example diagrams for describing the techniques herein.

FIG. 6 illustrates a first timing diagram 600 and a second timing diagram 620. The first timing diagram 600 relates to the single worker as described in relation to FIG. 2 and the sequence of collective and compute operations as described in relation to FIGS. 1-2. The all-gather operation 602 (for example, the all-gather operation 104 of FIG. 1) can be performed by the worker. After the worker performs the all-gather operation 602, the worker can perform one or more compute operations 604 (for example, the compute operation 108 of FIG. 1). As described herein, the one or more compute operations 604 can have data dependency from or on the all-gather operation 602. As such, the one or more compute operations 604 can wait until the completion of the all-gather operation 602. After the worker performs the one or more compute operations 604, the worker can perform the reduce-scatter operation 606 (for example, the reduce-scatter operation 112 of FIG. 1). As described herein, the reduce-scatter operation can have data dependency from or on the one or more compute operations 604. As such, the reduce-scatter operation 306 can wait until the completion of the one or more compute operations 604.

As described herein, the all-gather operation 602 and the reduce-scatter operation 606 are example collective operations. The all-gather operation 602 can be replaced with any collective operation. Likewise, the reduce-scatter operation 606 can be replaced with any collective operation. As described herein, the sequence of a first collective operation then one or more compute operations then a second collective operation is contemplated for the techniques described herein.

The second timing diagram 630 relates to workers and the sequence of collective and compute operations as described in relation to FIGS. 3-4 and 5A-5B. In this example, pipelining of the collective and compute operations can be used by a worker to increase efficiency of worker resources. In this example, the input at the worker is divided into a segment A (for example, In0 at 402 of FIG. 4) and segment B (for example, In0' at 432 of FIG. 4). The segment A is subject to the collective operations of a first all-gather operation 632A (for example, the first all-gather operation 404 of FIG. 4) and a first reduce-scatter operation 636A (for example, the first reduce-scatter operation 412 of FIG. 4). Similarly, the segment A is also subject to one or more first compute operations 634A between the first all-gather operation 632A and the first reduce-scatter operation 636A. The segment B is subject to the collective operations of a second all-gather operation 632B (for example, the second all-gather operation 434 of FIG. 4) and a second reduce-scatter operation 636B (for example, the second reduce-scatter operation 442 of FIG. 4). Similarly, the segment B is also subject to one or more second compute operations 634B between the second all-gather operation 632B and the second reduce-scatter operation 636B.

As noted in relation to FIGS. 5A-5B, the one or more first compute operations 634A and the second all-gather operation 632B can be performed after completion of the first all-gather operation 632A. Similarly, the one or more second compute operations 634B can be performed after completion of the one or more first compute operations 634A. The first reduce-scatter operation 636A can be performed after completion of the second all-gather operation 632B and the one or more first compute operations 634A. The second reduce-scatter operation 636B can be performed after completion of the first reduce-scatter operation 636A and the one or more second compute operations 634B. Here, the timing diagram 630 demonstrates that pipelining of the compute operations and collective operations leads to better utilization of the worker resources used for compute operations and collective operations. As shown in the second timing diagram, the one or more first compute operations 634A and the one or more second compute operations 634B can take longer to perform than one or more of the first all-gather operation 632A, the second all-gather operation 632B, the first reduce-scatter operation 636A, and the second reduce-scatter operation 636B. However, this is not always the case. In some examples, some or all of the collective operations can take longer to perform than one or more of the compute operations. Collective operations can take longer depending on the number of worker nodes being used in the model.

With reference to FIG. 7, some or all of the method 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 7 illustrates a computer-implemented method 700 for pipelining collective operations and compute operations, in accordance with some embodiments. One or more steps of the method 700 may be omitted during performance of the method 700, and steps of the method 700 may be performed in any order and/or in parallel. One or more steps of the method 700 may be performed by one or more processors. The method 700 may be implemented as a computer-readable medium or computer program product comprising instructions which, when the program is executed by one or more computers, cause the one or more computers to carry out the steps of the method 700. Such computer program products can be transmitted, over a wired or wireless network, in a data carrier signal carrying the computer program product.

At block 702, the first node can receive a first input tensor. At block 704, the first node can generate a first input subtensor and a second input subtensor based at least in part on the first input tensor. Generating the first input subtensor and the second input subtensor can include segmenting the first input tensor into the first input subtensor and the second input subtensor.

At block 706, the first node can perform a first collective operation based at least in part on the first input subtensor and a third input subtensor from a second node. The first collective operation can be a first all-gather operation or any other collective operation. Performing the first collective operation can include storing the first input subtensor and the third input subtensor in consecutive memory locations of the first node.

At block 708, the first node can perform certain operations after completion of the first collective operation. With reference to block 708, at block 710, the first node can perform a first compute operation to generate a first compute subtensor based at least in part on the first input subtensor and the third input subtensor. Performing the first compute operation can be based on a first set of weights stored on the first node. The second node can store a second set of weights different from the first set of weights. The first set of weights and the second set of weights can be referred to as partial weights. The first compute operation can begin to be performed prior to completion of the second collective operation. With reference to block 708, at block 712, the first node can perform a second collective operation to store the second input subtensor and a fourth input subtensor from the second node.

At block 714, the first node can perform certain operations after completion of the first compute operation. With reference to block 714, at block 716, the first node can perform a second compute operation to generate a second compute subtensor based at least in part on the second input subtensor and the fourth input subtensor. With reference to block 714, at block 718, the first node can perform a third collective operation to generate a first output subtensor based at least in part on the first compute subtensor and a third compute subtensor from the second node. The third collective operation can begin to be performed prior to completion of the second compute operation. The third collective operation can be a reduce-scatter operation or any other collective operation.

At block 720, after completion of the second compute operation, the first node can perform a fourth collective operation to generate a second output subtensor based at least in part on the second compute subtensor and a fourth compute subtensor from the second node.

At block 722, the first node can generate an output subtensor based at least in part on the first output subtensor and the second output subtensor. The third input subtensor can correspond to the first input subtensor. The fourth input subtensor can correspond to the second input subtensor. The third compute subtensor can correspond to the first compute subtensor. The fourth compute subtensor can correspond to the second compute subtensor.

The method 700 can further include receiving a request to perform a sequence of collective operations and compute operations in conjunction with the second node. The sequence of collective operations and compute operations can be associated with a machine learning model. The machine learning model can be trained based on the sequence of collective operations and compute operations. The first input tensor can correspond to training data.

FIGS. 8A and 8B includes a series of pseudo-code used to explain a sequence of how a compiler can use programming code and generate machine instructions that reflect the pipelining of collective operations and compute operations in the example code as described in relation to FIGS. 3-7. As illustrated at 800, the compiler can receive programming code written in a programming language to be changed into machine instructions to be carried out by one or more workers (for example, processors of the workers). The programming code can include a first collective operation (for example, the AllGather(A[8, 128]) rank 32 which represents an all-gather operation), a series of one or more compute operations (for example, the func(B[i, j, k]) which represents the compute operations), and a second collective operation (for example, the ReduceScatter(C[32, 8, 128]) rank 32 which represents a reduce-scatter operation). The rank can refer to the number of workers that are going to be used for this particular artificial neural network. The numbers of 8 and 128 represent dimensions to the tensor and can be multiplied together for the total number of input values. Any number of workers, any size of a dimension for a tensor, and any total number of input values can be used via the techniques described herein. The number represented are simply for illustrative purposes. All collective operators can also be legalized such that the highest dimension (for example, the first dimension) of the tensor is the rank dimension. For example, if the code received by the compiler did not have the rank dimension as the highest dimension of the collective operators, the compiler can rearrange the code to have the rank dimension as the highest dimension. As described herein, rearranging the code in the pseudo-code refers to reorganizing the sequence of related machine instructions that correspond to the pseudo-code.

As illustrated at 810, the compiler can tile the collective operations of the programming code. This operation by the compiler can be referred to as collective operation tiling. Both collective operations and computing operations can include a rank dimension, a tiling dimension, a partition dimension, and a free dimension. The rank dimension can refer to which worker node is processing particular data for the collective operations and computing operations. The tiling dimension can be defined by a tiling factor. The compiler can apply a tiling factor to the collective operations such that the collective operations can be represented as a loop that is executed a number of times equal to the tiling factor. The tiling factor can be any whole number and can be user-configurable. The tiling dimension can enable the pipelining of the collective operations and the one or more compute operations. The partition dimension can be a dimension that uses different scratchpad partitions in a spatial order. The free dimension can be a dimension that access data within each scratchpad partition. In the example seen in FIG. 8A, the scratchpad for the worker can have a size of 512 inputs. As seen in the operation AllGather(A[8, 128]) rank 32, the rank dimension is 32. The partition dimension is 8 and the free dimension is 128. In this way, the AllGather operation can be viewed as operating on 8 partitions of 128 inputs.

Returning to the tiling factor, in the example pseudo code at 810, the tiling factor is two such that the loop is written as "for i in 0 . . . 2". In order to perform the collective operation based on the tiling, the highest dimension of the output tensors of the collective operations becomes the tiling factor. The highest dimension of the tensor that is not the rank dimension is divided by the tiling factor. In this example, the highest dimension of the tensor is the partition dimension. For example, B[32, 8, 128] at 800 becomes B[i, 32, 4, 128] at 810. The compiler uses this rearrangement so that the machine instructions for the first segment of inputs at each worker can be all-gathered first (for example, the In0, In1, In2, In3 at 406 of FIG. 4) before the second segment of inputs are all-gathered (for example, the In0', In1', In2', In3' at 426 of FIG. 4). By rearranging the machine instructions, the memory layout for the output of the all-gather operation at each worker is also changed. For example, if the number of workers was four as described in relation to FIG. 4, the memory layout for the all-gather operation at each worker can be in right-to-left order of In0, In1, In2, In3, In0', In1', In2', In3'.

Similarly, the compiler can tile the compute operations of the programming code. Int this example, the one or more compute functions can also be decomposed into the constituent compute functions. For example, the compute function func can be decomposed into a multiple compute function and a relu compute function. The compiler can also apply a tiling factor to each compute operation by creating an outer loop and inner loop. The inner loop can represent the high dimension of the compute operation (and corresponding input tensor) that is not the rank dimension divided by the tiling factor. The outer loop can represent the tiling factor. For example, j1 can represent the highest dimension of the compute operation that is not the rank dimension divided by the tiling factor (8 divided by 2 equals 4). j0 can represent the tiling factor.

As illustrated at 820 of FIG. 8B, the compiler can determine thread axes for the dataflow graph of the sequence of collective operations and compute operations. This operation by the compiler can be referred to as collective axes group analysis. The compiler begins by examining the first collective operation and traversing the dataflow graph in a depth first search order. For example, at 810 of FIG. 8A, the compiler would start the depth first search at the AllGather function. The compiler can determine that the output tensor B of the AllGather function is used by the multiply function (and multiplied by the input x in the example at 810). The compiler can determine that the first dimension j0 of the tensor B is the thread dimension for the tensor B. The loop (of the nested loops) associated with the thread dimension can be marked as a thread axis. Recursively, the compiler can find all thread axes with the shared tensor dimension j0 across different loops and mark the corresponding axes as thread axes. In this case, the j0 across all of the nested loops (or unnested loops) can be identified and marked as a thread axes as shown at 820.

As illustrated at 830, the compiler can rearrange each compute operation loopnest to be a single loop along the thread axis. This operation by the compiler can be referred to as thread axis aware layout and tiling. For example, the multiply compute loopnest at 820 can be rearranged to be a single loop along the thread axis j0 at 820 (the thread axis j at 830). The compute operations can also be modified into simplified functions that are easily translated to machine instructions. In this example, the multiply function has been changed to the single hardware single input multiple data function (SIMD) SIMD_MULTIPLY. Likewise, the relu function has been changed to the single hardware SIMD function SIMD_RELU. In this example, the free dimension for the tensors was also vectorized. In this example, the dimensions for the SIMD_MULTIPLY and SIMD_RELU include 0:512 based on the free dimension of the hardware device. For example, a sample hardware device can have a free dimension of 512 such that 512 inputs can be accessed within each scratchpad partition of the hardware device. Different types of compute operations can be modified into other simplified and corresponding functions that are easily translated to machine instructions.

In some examples, the tiling dimension can be the partition dimension of loopnests after thread axis aware layout and tiling described herein. If the remaining tiled dimension is less than the number of partitions within the scratchpad, the thread axis can be converted to part of the partition dimension via partition vectorization. For example, the collective operation tiling can be partially or wholly reverted.

In some examples, the compiler that generates the machine instructions can be on a worker or separate from a worker. In some examples, each compiler for each worker can generate machine instructions for that particular worker based on the programming code. In some examples, a compiler external from the workers can generate the respective machine instructions for each worker and transmit the respective machine instructions to each worker.

As illustrated at 840, the compiler can reduce memory capacity and improve scratchpad locality via loop fusion. This operation by the compiler can be referred to as thread axis aware loop fusion. In this step, loopnests that are writing to the same scratchpad memory results can be fused into a single loopnest. In this example, the thread axis for the AllGather, compute operations, and the ReduceScatter are all along the same loop dimensions. Thus, the loops can be fused via loop fusion to form a single loop with the tiling factor as the loop's dimension.

Figure 9:
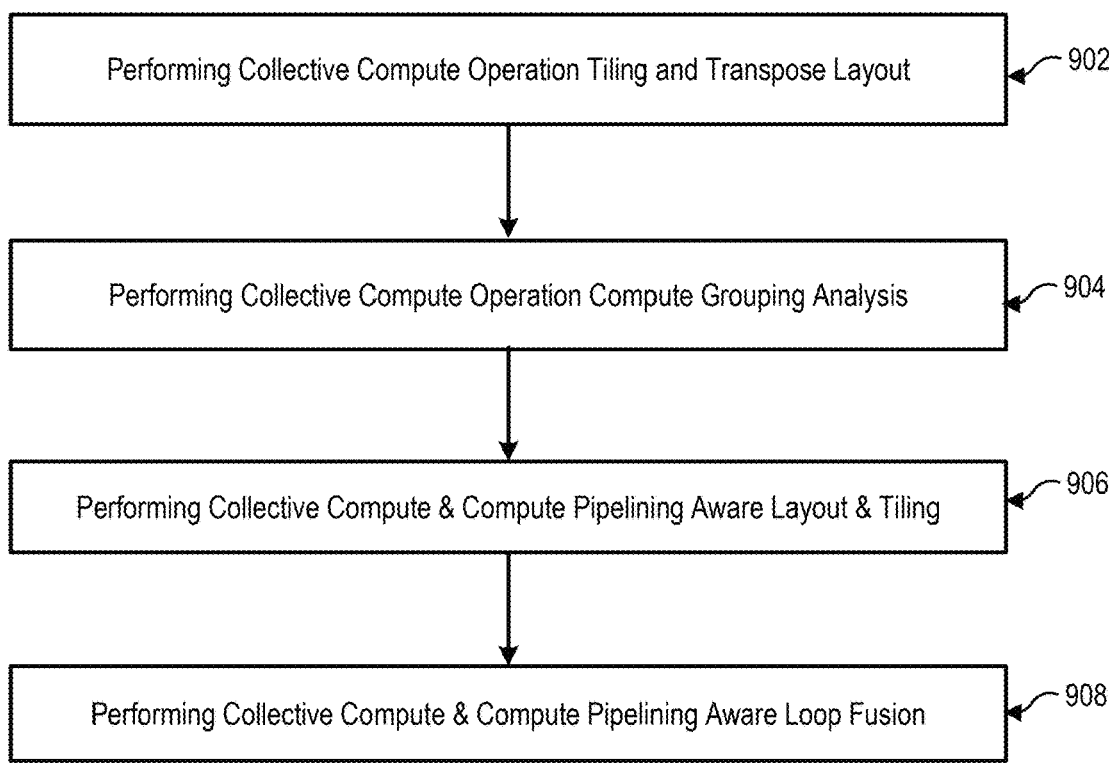
FIG. 9 illustrates an example computer-implemented method for the techniques described herein.

With reference to FIG. 9, some or all of the method 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 9 illustrates a compiler-implemented method 900 for generating machine instructions to pipeline collective operations and compute operations based on received compute code, in accordance with some embodiments. One or more steps of the method 900 may be omitted during performance of the method 900, and steps of the method 900 may be performed in any order and/or in parallel. One or more steps of the method 900 may be performed by one or more processors. The method 900 may be implemented as a computer-readable medium or computer program product comprising instructions which, when the program is executed by one or more computers, cause the one or more computers to carry out the steps of the method 900. Such computer program products can be transmitted, over a wired or wireless network, in a data carrier signal carrying the computer program product.

At block 902, a compiler can perform collective compute operation tiling and transpose layout. For example, the compiler can receive a sequence of operations for operating a machine learning model in computer code form to be converted into machine instructions for execution on a first integrated circuit device. The sequence of operations can include an all-gather operation, one or more compute operations, and a reduce-scatter operation. Each operation of the sequence of operations can include a rank dimension and a highest non-rank dimension. In another example, the compiler can modify the computer code, for each operation of the sequence of operations, by dividing the highest non-rank dimension by a tiling factor size and adding a new highest dimension of a tiling factor size. The rank dimension can correspond to a number of integrated circuit devices in the set of integrated circuit devices.

At block 904, the compiler can perform collective compute operation compute grouping analysis. For example, the compiler can determine a thread axis for an output of the all-gather operation. Determining a thread axis for an output can include identifying the new highest dimension for the output of the all-gather operation. The compiler can also determine respective thread axes for each operation of the sequence of operations based on the thread axis for the output of the all-gather operation.

At block 906, the compiler can perform collective compute and compute pipelining aware layout and tiling. For example, the compiler can modify the computer code such that each operation of the sequence of operations is a singular thread axis dimension loop associated with the respective thread axis of the operation, each singular thread axis dimension loop having a size of the tiling factor.

At block 908, the compiler can perform collective compute and compute pipelining aware loop fusion. For example, the compiler can generate new computer code by modifying the computer code to fuse the singular thread axis dimension loops for each operation of the sequence of operations into a pipeline loop having a size of the tiling factor.

The method 900 can also include the compiler generating the machine instructions for the first integrated circuit device based on the new computer code. The machine learning model can be configured to be executed on a set of integrated circuit devices including the integrated circuit device. The method 900 can also include generating second machine instructions for a second integrated circuit device of the set of integrated circuit devices based on the modified computer code.

Figure 10:
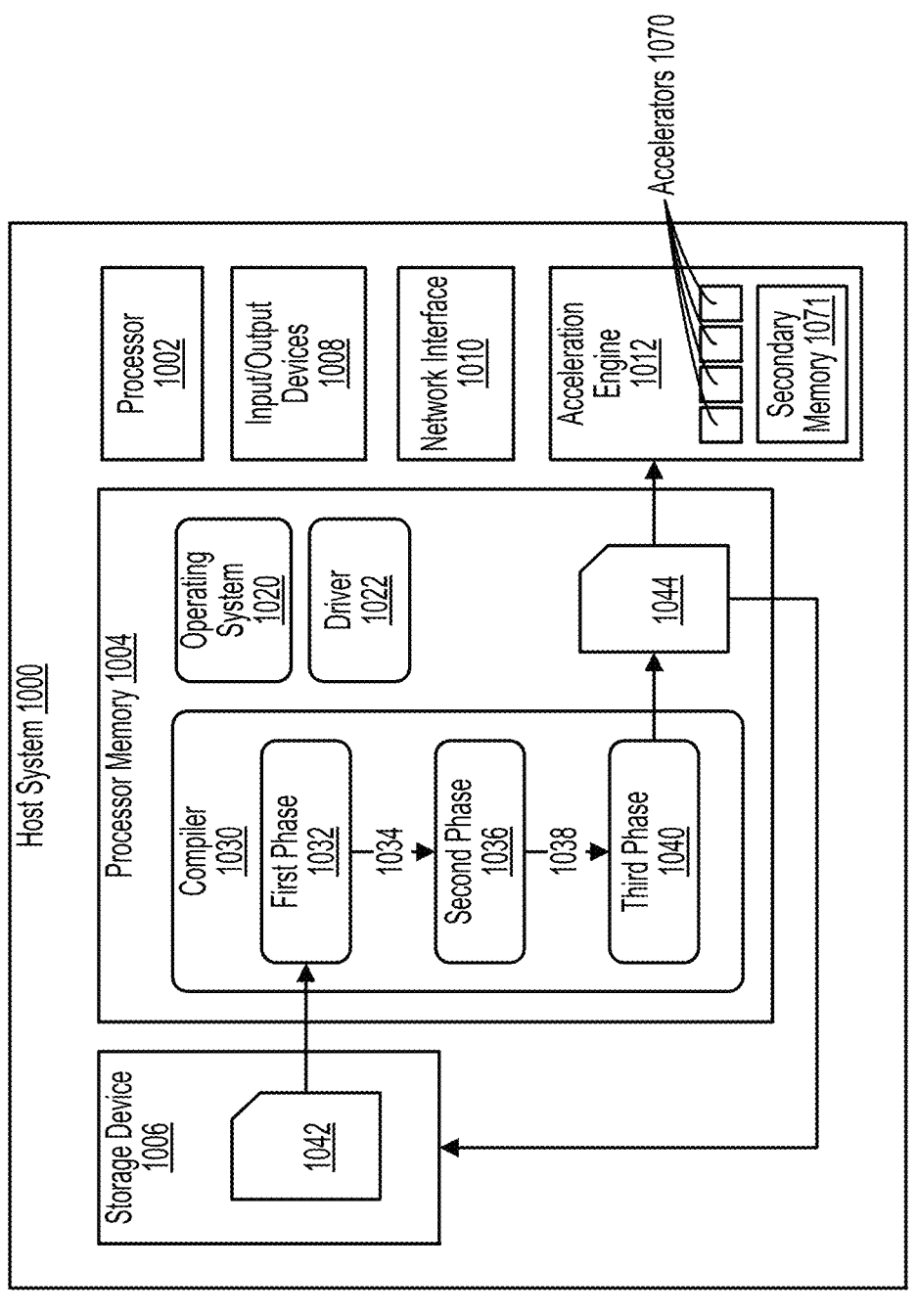
FIG. 10 includes a block diagram illustrating an example host system.

FIG. 10 includes a block diagram illustrating an example of a host system 1000 on which a compiler 1030, such as is described herein, can run. The illustrated host system 1000 is an example of a computing device, and includes a processor 1002, a processor memory 1004, at least one storage device 1006, various Input/Output (I/O) devices 1008, and at least one network interface 1010. In the example of FIG. 10, the host system 1000 also includes an acceleration engine 1012, which is an integrated circuit device that can accelerate certain operations or computations performed by the host system 1000. In various examples, the host system 1000 can be implemented as a server in a data center, a desktop computer, a laptop computer, a tablet computer, or a smartphone, among other examples. In some examples, operations or components discussed below as performed or included in the host system 1000 can be performed or included in other computer devices. For example, the compiler 1030 can execute on the host system 1000 while the acceleration engine 1012 is located at a different host system.

The processor 1002 is an integrated circuit device that can execute program code, in the form of instructions. The program code can be for various software applications or tools, such as an operating system 1020 or the illustrated compiler 1030. While the processor 1002 is executing a program, the instructions for the program can be stored in the processor memory 1004. The instructions can also be stored elsewhere, such as on the storage device 1006, and can be loaded into the processor memory 1004 when needed by the processor 1002. The processor 1002 can also use the processor memory 1004 for temporary storage of other data on which the processor 1002 is operating. In various examples, the processor memory 1004 is a volatile memory type, such as a type of Random Access Memory, though non-volatile memory types can, alternatively or additionally, be used for the processor memory 1004.

The storage device 1006 is an example of a device that can include non-volatile memory. For example, the storage device 1006 can be a magnetic disk drive, a solid state drive, or an optical drive, among other examples. The storage device 1006 can further be non-transitory, such that program code and other data stored on the storage device 1006 remains present when the storage device 1006 is not powered on.

The storage device 1006 is one example of a peripheral device, which are components that can be coupled to the host system 1000 to add functionality to the host system 1000. Other examples of peripheral devices include the Input/Output devices 1008 and the network interface 1010. The Input/Output devices 1008 can include user input and output devices, such as keyboards, mice, touch screens, microphones, display screens, speakers, printers, and scanners, among other examples. The network interface 1010, which can be implemented using a network interface card, can provide access to one or more networks. The network interface 1010 can include, for example, a physical port for connecting a network cable and/or wireless antennas for communicating with Wi-Fi and/or cellular networks. The network interface 1010 can also be described as an I/O device.

The acceleration engine 1012 is also another type of peripheral device or I/O device. The acceleration engine 1012 is a device that is purpose built to perform certain operations that can be performed by the processor 1002, but can be performed faster by the acceleration engine 1012. For example, the acceleration engine 1012 can be a neural network accelerator, and, as such, may be able to perform the large scale, parallel computations of a neural network more efficiently than when the computations are performed by the processor 1002. As another example, the acceleration engine 1012 can be a graphics processing unit (GPU), and may be optimized to perform the computations needed for graphics rendering. Other examples of devices that can be implemented by the acceleration engine 1012 include cryptographic accelerators, compression and decompression accelerators, 3-D accelerators, regular expression accelerators, security accelerators, and others.

In various examples, the acceleration engine 1012 can execute program code to perform certain operations. For example, when the acceleration engine 1012 is a neural network accelerator, the acceleration engine 1012 can be programmed to execute a particular neural network, such as one that performs image recognition or one that performs machine translation. As a further example, to support the execution of a neural network, the acceleration engine 1012 can be programed to perform operations such as copying data for the neural network from processor memory 1004 (for example) into the acceleration engine 1012, copying input data for the neural network from processor memory 1004 into the acceleration engine 1012, and/or copying results from the acceleration engine 1012 into the processor memory 1004, among other examples.

To generate program code for the acceleration engine 1012, in various examples, the host system 1000 can execute the compiler 1030. Compilers, in general, are software programs that translate program code written in a human-readable language into a format (e.g., machine instructions) that can be read and processed by an integrated circuit device. In the example of FIG. 10, the acceleration engine 1012 is a neural network accelerator and the compiler 1030 is for compiling a neural network description into instructions to be executed by the acceleration engine 1012. When the acceleration engine 1012 implements a different type of accelerator, another compiler can be used.

The compiler 1030 can be activated, for example, when the operating system 1020 receives keyboard, mouse, touch-screen, voice commands, or other inputs from the Input/Output devices 1008. The inputs can further include parameters for the compiler 1030, such as the input code 1042 to compile and configuration options for the compilation process. Once the compiler 1030 is activated, the processor 1002 can load the instructions for the compiler 1030 into the processor memory 1004, and can execute the instructions.

In the example of FIG. 10, the compiler 1030 includes a first stage 1032, a second stage 1036, and a third stage 1040, which each perform different operations to produce compiled code 1044. In other examples, the compiler 1030 can combine the operations of the first stage 1032, second stage 1036, and/or third stage 1040 into fewer stages, or can divide the operations of one of the stages into multiple stages.

The first stage 1032 can receive and process input code 1042. The input code 1042 can describe a program in a high-level programming language, such as Java, C++, or Tensorflow, among many other examples. The input code 1042 can describe, for example, steps to perform image recognition, speech recognition, machine translation, or other operations. The input code 1042 can be obtained, for example, from the storage device 1006. Alternatively, though not illustrated here, the input code 1042 may be located in the processor memory 1004 or can be obtained from a network location, using the network interface 1010. Processing of the input code 1042 can include sorting the operations described in the input code 1042 into layers, where the outputs of one layer provide the inputs to a next layer. Processing can also include identifying steps to be performed by the processor 1002, rather than by the acceleration engine 1012. For example, the processor 1002, through the execution of a driver 1022, may need to perform steps such as configuring Direct Memory Access (DMA) descriptors for moving data into or out of the acceleration engine 1012, among other examples.

The output 1034 of the first stage 1032 can be organized, for example, in the layers, nodes, and connections between nodes of a neural network. The second stage 1036 can perform intermediate processing on this output 1034. For example, the operations performed in any one layer, or at any one node in a layer, may be too many for the acceleration engine 1012 to perform at the same time. The acceleration engine 1012 may, for example, have a limited amount of locale storage space for the data needed for a computation, or the computations may be more than the acceleration engine 1012 can perform at one time. In this example, the first stage 1032 can break the operations of the layer or node down into smaller operations, which can fit into the acceleration engine's local memory and/or can fit into the computing capacity of the acceleration engine 1012. Processing of the output 1034 of the first stage 1032 can include other steps, such as scheduling, or determining the order in which the acceleration engine 1012 and/or processor 1002 will perform operations, among other examples.

In various examples, the output 1038 of the second stage 1036 includes the various steps to be performed by components of the acceleration engine 1012, in the order that the steps are to be performed. The output 1038 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1040 can operate on the output 1038 of the second stage 1036, and perform various steps before producing the instructions that are to be executed by the acceleration engine 1012. These steps can include, for example, removing redundant dependencies, resolving or handling dependencies between nodes by inserting synchronization instructions into the code, identifying possibly optimizations in memory usage or memory bandwidth usage, and other operations.

In some examples, the third stage 1040 can include a data scheduler 1050.

The output of the third stage 1040 is compiled code 1044, which may include machine instructions in binary format. In some examples, the compiled code 1044 can be stored in the processor memory 1004. Alternatively or additionally, the compiled code 1044 can be copied to the storage device 1006 or to a network location. As noted above, the acceleration engine 1012 may be located at a different host system, in which case the compiled code 1044 can be sent over the network interface 1010 to the other host system.

In the example of FIG. 10, the host system 1000 can be executing a driver 1022, which can also be referred to as a device driver or runtime driver, that manages the acceleration engine 1012. The driver 1022 can provide an interface between applications executing on the host system 1000 (or on another host system) and the acceleration engine 1012. For example, the driver 1022 can provide an Application Program Interface (API) that defines functions for feeding input data to the acceleration engine 1012 and defining the operation to perform on the input data. In this and other examples, the driver 1022 can configure the acceleration engine 1012 to perform the operation. For example, the driver 1022 can identify a neural network that the acceleration engine 1012 is to execute, as well as the location in the processor memory 1004 or on the storage device 1006 where the compiled code 1044 for the neural network is located. The driver 1022 can further load into the acceleration engine 1012 or cause the acceleration engine 1012 to load the compiled code 1044, can load or cause the acceleration engine 1012 to load the input data on which the neural network is to operate, and/or can cause the acceleration engine 1012 to being executing on the input data. Once the acceleration engine 1012 has finished, the acceleration engine 1012 can notify the driver 1022, and the driver 1022 can deliver a result back to the application that requested the result.

Figure 11:
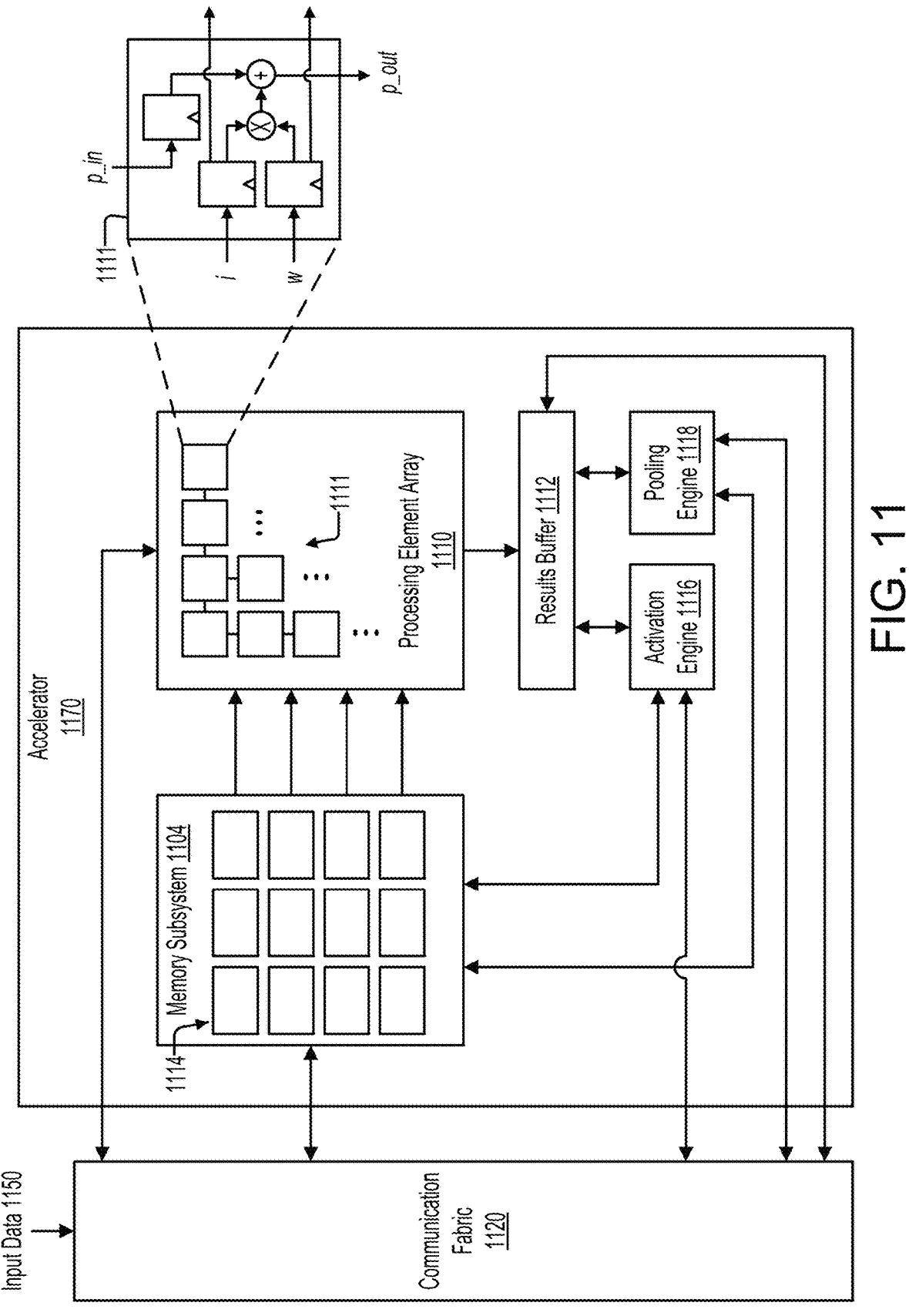
FIG. 11 is a block diagram illustrating an example of an integrated circuit device.

FIG. 11 is a block diagram illustrating an example of an integrated circuit device that can include pipelining of collective operations and compute operations. The example of FIG. 11 illustrates an accelerator 1102. In various examples, the accelerator 1102, for a set of input data (e.g., input data 1150), can execute computations using a processing engine array 1110, an activation engine 1116, and/or a pooling engine 1118. In some examples, the example accelerator 1102 may be an integrated circuit component of a processor, such as a neural network processor. The processor may have other integrated circuit components, including additional accelerator engines.

In various implementations, the memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116 and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w', where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p_in, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111. Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

Herein, the activation engine 1116 and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116 and/or pooling engine 1118 may be enabled for computations called for by certain layers of the neural network. The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location.

Figure 12:
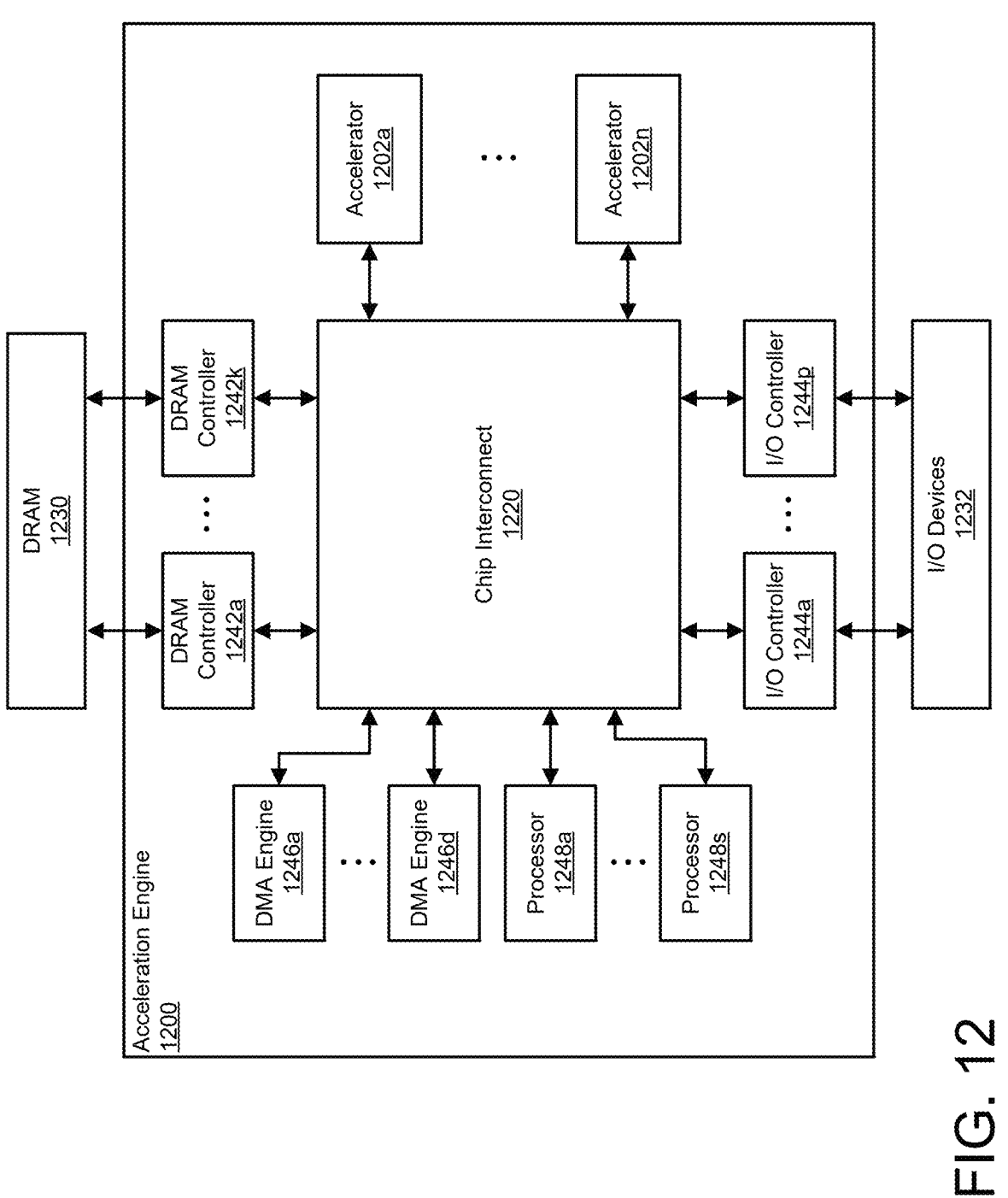
FIG. 12 includes a block diagram that illustrates an example of an acceleration engine.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 11.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators

1202a-1202n can be programmed with different programs, so that each performs a different set of operations. In various examples, the processors 1248a-1248s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248a-1248s, which can also be referred to as data management processors. In the example of FIG. 12, the acceleration engine 1200 includes s processors 1248a-1248s incorporated into the device (e.g., on the same silicon die). In other examples, the processors 1248a-1248s can be external to the acceleration engine 1200 (e.g., on a different die and/or in a different package). In some examples, the processors 1248a-1248s can manage the movement of data from I/O devices 1232 to the accelerators 1202a-1202n or the DRAM 1230. For example, input data may be located at an I/O device 1232 or in processor memory, and the processors 1248a-1248s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248*a*-1248*s* can be responsible for managing the data movement for a different accelerator. In some examples, a processor may manage the data movement for more than one accelerator. Similarly, in various examples, each of the processors 1248*a*-1248*s* can be assigned to one or more DMA engines 1246*a*-1246*d*. In these and other examples, associations between processors 1248*a*-1248*s*, accelerators 1202*a*-1202*n*, and DMA engines 1246*a*-1246*d* are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
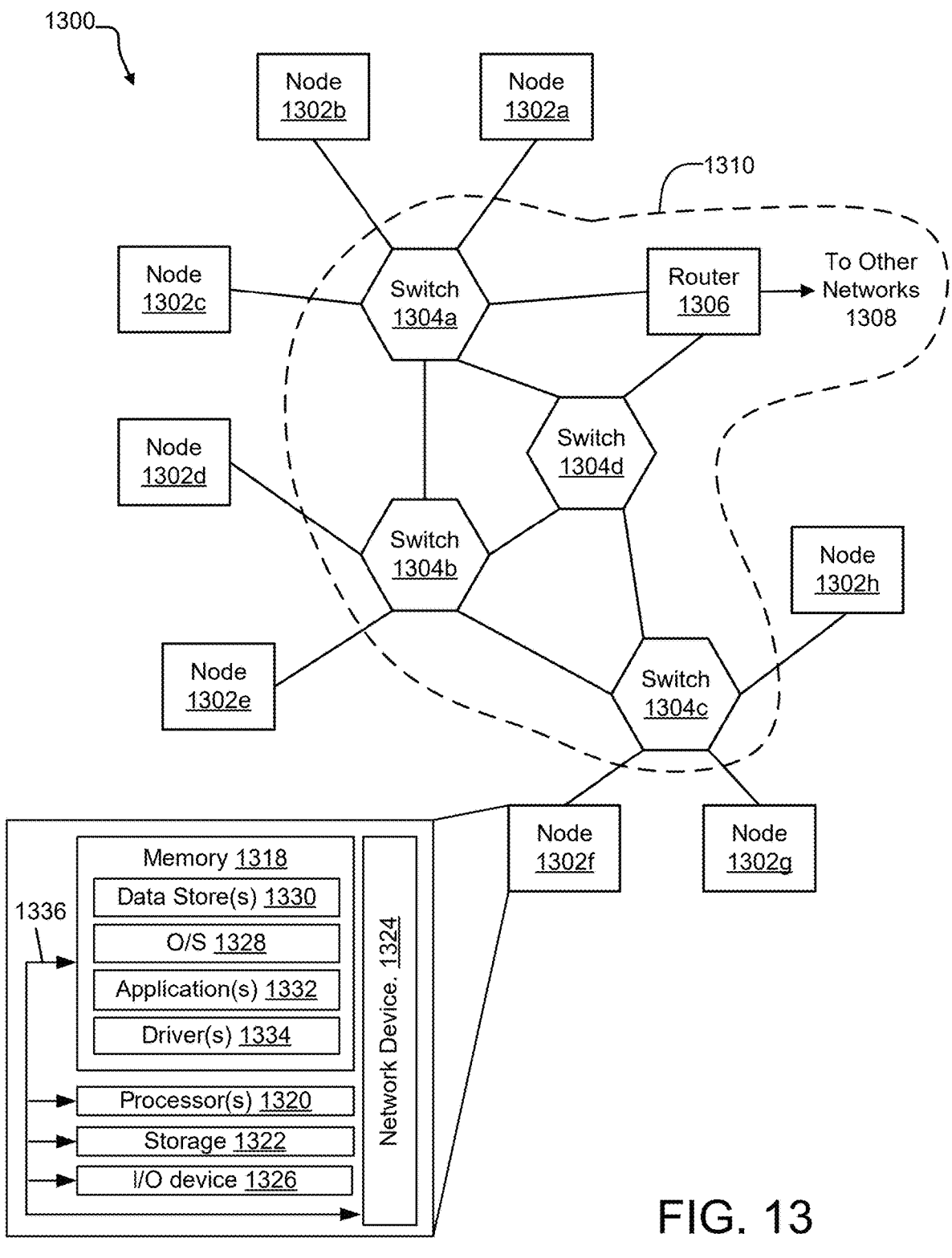
FIG. 13 includes a network which can include one or more host systems.

FIG. 13 includes a diagram of an example network 1300, which can include one or more host systems, such as the host system illustrated in FIG. 10. For example, the example network 1300 of FIG. 13 includes multiple nodes 1302*a*-1302*h*, one or more of which can be a host system such as is illustrated in FIG. 10. Others of the nodes 1302*a*-1302*h* can be other computing devices, each of which include at least a memory for storing program instructions, a processor for executing the instructions, and a network interface for connecting to the network 1300.

In various examples, the network 1300 can be used to process data. For example, input data can be received at one of the nodes 1302*a*-1302*h* or from other networks 1308 with which the network 1300 can communicate. In this example, the input data can be directed to a node in the network 1300 that includes an acceleration engine, for the acceleration engine to operate on and produce a result. The result can then be transferred to the node or other network from which the input data was received. In various examples, input data can be accumulated from various sources, including one or more of the nodes 1302*a*-1302*h* and/or computing devices located in the other networks 1308, and the accumulated input data can be directed to one or more host systems in the network 1300. Results from the host systems can then be distributed back to the sources from which the input data was gathered.

In various examples, one or more of the nodes 1302*a*-1302*h* can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 13, the nodes 1302*a*-1302*h* are connected to one another using a switched architecture with point-to point links. The switched architecture includes multiple switches 1304*a*-1304*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1304*a*-1304*d* of FIG. 13 may be connected to the nodes 1302*a*-1302*h* and provide multiple paths between any two nodes.

The network 1300 may also include one or more network devices for connection with other networks 1308, such as a router 1306. Routers use headers and forwarding tables to determine the best path for forwarding the packets, and use protocols such as internet control message protocol (ICMP) to communicate with each other and configure the best route between any two devices. The router 1306 of FIG. 13 can be used to connect to other networks 1308 such as subnets, LANs, wide area networks (WANs), and/or the Internet.

In some examples, network 1300 may include any one or a combination of many different types of networks, such as cable networks, the Internet, wireless networks, cellular networks and other private and/or public networks. The interconnected switches 1304*a*-1304*d* and the router 1306, if present, may be referred to as a switch fabric 1310, a fabric, a network fabric, or simply a network. In the context of a computer network, terms "fabric" and "network" may be used interchangeably herein.

The nodes 1302*a*-1302*h* may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a net-book computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device (s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is config-ured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines imple-mented in a hosted computing environment. The hosted computing environment may include one or more rapidly provisioned and released computing resources. These com-puting resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software ser-vices. These servers may be configured as part of an inte-grated, distributed computing environment. In some aspects, the service provider computer(s) may, additionally or alter-natively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network(s) 1300.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-program product tangibly embodied in a non-transitory machine-readable storage medium, the computer-program product including instructions configured to cause a processor to perform operations for executing a compiler, the operations comprising:

receiving a sequence of operations for operating a machine learning model in computer code form to be converted into machine instructions for execution on a first integrated circuit device, the sequence of operations including an all-gather operation, one or more compute operations, and a reduce-scatter operation, each operation of the sequence of operations 8 including a rank dimension and a highest non-rank dimension;

pipelining the sequence of operations by:

modifying the computer code, for each operation of the sequence of operations, by dividing the highest non-rank dimension by a tiling factor size and adding a new highest dimension of the tiling factor size;

determining a thread axis for an output of the all-gather operation;

determining respective thread axes for each operation of the sequence of operations based on the thread axis for the output of the all-gather operation;

modifying the computer code such that each operation of the sequence of operations is a singular thread axis dimension loop associated with the respective thread axis of the operation, each singular thread axis dimension loop having a size of the tiling factor; and modifying the computer code to fuse the singular thread axis dimension loops for each operation of the sequence of operations into a pipeline loop having a size of the tiling factor; and generating the machine instructions for the first integrated circuit device based on the modified computer code.

2. The computer-program product of claim 1, wherein the machine learning model is configured to be executed on a set of integrated circuit devices including the first integrated circuit device, the operations further comprising:

generating second machine instructions for a second integrated circuit device of the set of integrated circuit devices based on the modified computer code.

3. The computer-program product of claim 2, wherein the rank dimension corresponds to a number of integrated circuit devices in the set of integrated circuit devices.

4. The computer-program product of claim 1, wherein determining a thread axis for an output of the all-gather operation includes identifying the new highest dimension for the output of the all-gather operation.

5. A computer-implemented method comprising:

receiving, by a first node, a first input tensor;

generating, by the first node, a first input subtensor and a second input subtensor based on the first input tensor;

performing, by the first node, a first all-gather operation to store the first input subtensor and a third input subtensor from a second node;

after completion of the first all-gather operation:

performing, by the first node, a first compute operation to generate a first compute subtensor based on the first input subtensor and the third input subtensor;

performing, by the first node, a second all-gather operation to store the second input subtensor and a fourth input subtensor from the second node;

after completion of the first compute operation:

performing, by the first node, a second compute operation to generate a second compute subtensor based on the second input subtensor and the fourth input subtensor;

performing, by the first node, a first reduce-scatter operation to generate a first output subtensor based on the first compute subtensor and a third compute subtensor 17 from the second node;

after completion of the second compute operation, performing, by the first node, a second reduce-scatter operation to generate a second output subtensor based on the second compute subtensor and a fourth compute subtensor from the second node; and generating, by the first node, an output tensor based on the first output subtensor and the second output subtensor.

6. The computer-implemented method of claim 5, wherein generating the first input subtensor and the second input subtensor includes segmenting the first input tensor into the first input subtensor and the second input subtensor.

7. The computer-implemented method of claim 5, wherein performing the first all-gather operation includes storing the first input subtensor and the third input subtensor in consecutive memory locations of the first node.

8. The computer-implemented method of claim 5, wherein performing the first compute operation is further based on a first set of weights stored on the first node, wherein the second node stores a second set of weights different from the first set of weights.

9. The computer-implemented method of claim 5, wherein the first compute operation begins to be performed prior to completion of the second all-gather operation.

10. The computer-implemented method of claim 5, wherein the first reduce-scatter operation begins to be performed prior to completion of the second compute operation.

11. The computer-implemented method of claim 5, wherein the third input subtensor corresponds to the first input subtensor, wherein the fourth input subtensor corresponds to the second input subtensor, wherein the third compute subtensor corresponds to the first compute subtensor, and wherein the fourth compute subtensor corresponds to the second compute subtensor.

12. The computer-implemented method of claim 5, further comprising receiving, by the first node, a request to perform a sequence of collective operations and compute operations in conjunction with second node, the sequence of collective operations and compute operations associated with a machine learning model.

13. The computer-implemented method of claim 12, wherein the machine learning model is being trained based on the sequence of collective operations and compute operations, and wherein the first input tensor corresponds to training data.

14. A method implemented at a first node, the method comprising:

receiving a first input tensor;

generating a first input subtensor and a second input subtensor based on the first input tensor;

performing a first collective operation based on the first input subtensor and a third input subtensor from a second node;

after completion of the first collective operation:

performing a first compute operation to generate a first compute subtensor based on the first input subtensor and the third input subtensor;

performing a second collective operation to store the second input subtensor and a fourth input subtensor from the second node;

after completion of the first compute operation:

performing a second compute operation to generate a second compute subtensor based on the second input subtensor and the fourth input subtensor;

performing a third collective operation to generate a first output subtensor based on the first compute subtensor and a third compute subtensor from the second node;

after completion of the second compute operation, performing a fourth collective operation to generate a second output subtensor based on the second compute subtensor and a fourth compute subtensor from the second node; and generating an output tensor based on the first output subtensor and the second output subtensor.

15. The method of claim 14, wherein the first compute operation begins to be performed prior to completion of the second collective operation.

16. The method of claim 14, wherein third collective operation begins to be performed prior to completion of the second compute operation.

17. The method of claim 14, wherein performing the first compute operation is based on a first set of weights stored on the first node, wherein the second node stores a second set of weights different from the first set of weights.

18. The method of claim 14, wherein performing the first collective operation includes storing the first input subtensor and the third input subtensor in consecutive memory locations of the first node.

19. The method of claim 14, wherein the third collective operation is a reduce-scatter operation.

20. The method of claim 14, further comprising receiving a request to perform a sequence of collective operations and compute operations in conjunction with the second node, the sequence of collective operations and compute operations associated with a machine learning model.

* * * * *